US012262287B2

(12) United States Patent
Pezeshki et al.

(10) Patent No.: US 12,262,287 B2
(45) Date of Patent: Mar. 25, 2025

(54) WIRELESS SIGNALING IN FEDERATED LEARNING FOR MACHINE LEARNING COMPONENTS

(71) Applicant: QUALCOMM Incorporated, San Diego, CA (US)

(72) Inventors: Hamed Pezeshki, San Diego, CA (US); Tao Luo, San Diego, CA (US); Taesang Yoo, San Diego, CA (US); Jung Ho Ryu, Fort Lee, NJ (US); Junyi Li, Chester, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/111,469

(22) Filed: Dec. 3, 2020

(65) Prior Publication Data
US 2022/0182802 A1   Jun. 9, 2022

(51) Int. Cl.
*H04W 4/30* (2018.01)
*G06N 3/04* (2023.01)
(Continued)

(52) U.S. Cl.
CPC ............... *H04W 4/30* (2018.02); *G06N 3/04* (2013.01); *G06N 20/00* (2019.01); *H04W 72/21* (2023.01); *H04W 72/23* (2023.01)

(58) Field of Classification Search
CPC ... H04W 4/30; H04W 72/0413; H04W 72/14; H04W 88/02; H04W 88/08; G06N 3/04; G06N 20/00; G06N 3/08; G01S 19/00
See application file for complete search history.

(56) References Cited

U.S. PATENT DOCUMENTS 9,990,587 B2 * 6/2018 Okanohara ............ G06N 20/00
10,402,469 B2 * 9/2019 McMahan ............... G06F 17/17
(Continued)

FOREIGN PATENT DOCUMENTS

WO   WO-2021121585 A1 *  6/2021
WO   WO-2021158313 A1 *  8/2021 ............. G06N 20/00
(Continued)

OTHER PUBLICATIONS

Saurav Prakash et al.: "Coded Computing for Low-Latency Federated Learning over Wireless Edge Networks", arxiv.org, Cornell University Library, 201 Olin Library Cornell University Ithaca, NY 14853, Nov. 12, 2020 (Nov. 12, 2020), XP081812364, DOI: 10.1109/JSAC.2020.3036961 (Year: 2020).*
(Continued)

*Primary Examiner* — Asghar H Bilgrami
(74) *Attorney, Agent, or Firm* — Harrity & Harrity LLP/QUALCOMM Incorporated

(57) ABSTRACT

Various aspects of the present disclosure generally relate to wireless communication. In some aspects, a base station may transmit, to a user equipment (UE), a federated learning configuration that indicates one or more parameters of a federated learning procedure associated with a machine learning component. The base station may receive a local update associated with the machine learning component from the UE based at least in part on the federated learning configuration. Numerous other aspects are provided.

46 Claims, 12 Drawing Sheets

(51) Int. Cl.
| | |
|---|---|
| *G06N 3/08* | (2023.01) |
| *G06N 20/00* | (2019.01) |
| *H04W 72/21* | (2023.01) |
| *H04W 72/23* | (2023.01) |
| *H04W 88/02* | (2009.01) |
| *H04W 88/08* | (2009.01) |

(56) References Cited

U.S. PATENT DOCUMENTS

| | | | | |
|---|---|---|---|---|
| 2016/0217387 | A1* | 7/2016 | Okanohara | G06N 20/00 |
| 2016/0217388 | A1* | 7/2016 | Okanohara | G06N 20/00 |
| 2017/0094673 | A1 | 3/2017 | Jitsukawa et al. | |
| 2018/0018590 | A1* | 1/2018 | Szeto | G16H 40/20 |
| 2020/0027019 | A1* | 1/2020 | Yang | G06Q 20/326 |
| 2020/0027556 | A1* | 1/2020 | Xie | G16H 30/40 |
| 2020/0279169 | A1* | 9/2020 | Hoskins | G06N 3/10 |
| 2021/0166157 | A1* | 6/2021 | Bhowmick | G06N 20/20 |
| 2021/0216902 | A1* | 7/2021 | Sutcher-Shepard | G06N 5/01 |
| 2021/0374605 | A1* | 12/2021 | Qian | G06N 20/00 |
| 2021/0374617 | A1* | 12/2021 | Chu | G06N 3/084 |
| 2022/0004933 | A1* | 1/2022 | Gu | G06N 20/20 |
| 2022/0101204 | A1 | 3/2022 | Ly et al. | |
| 2022/0104033 | A1 | 3/2022 | Ly et al. | |
| 2022/0116764 | A1* | 4/2022 | Pezeshki | H04L 41/0823 |
| 2022/0124628 | A1* | 4/2022 | Pezeshki | G06N 3/08 |
| 2022/0124779 | A1* | 4/2022 | Pezeshki | H04W 72/042 |
| 2022/0180251 | A1 | 6/2022 | Pezeshki et al. | |
| 2023/0162047 | A1* | 5/2023 | Mortazavi | G06N 3/08 706/15 |
| 2023/0177349 | A1* | 6/2023 | Balakrishnan | G06N 3/08 706/25 |

FOREIGN PATENT DOCUMENTS

| | | |
|---|---|---|
| WO | WO-2021199053 A1 * | 10/2021 |
| WO | WO-2021247448 A1 * | 12/2021 |
| WO | WO-2021259492 A1 * | 12/2021 |
| WO | WO-2022060748 A1 * | 3/2022 |
| WO | WO-2022095523 A1 * | 5/2022 |

OTHER PUBLICATIONS

Tian Li: "Federated Learning: Challenges, Methods, and Future Directions", Publication Date: 2020-05-01, ISSN (Paper): 1053-5888, IEEE Signal Processing Magazine (vol. 37, Issue: 3, 2020, pp. 50-60) (Year: 2020).*

Wei Yang Bryan Lim: Federated Learning in Mobile Edge Networks: A Comprehensive Survey:, ISSN (Electronic): 1553-877X, Publication Date: Jul. 1, 2020, IEEE Communications Surveys & Tutorials (vol. 22, Issue: 3, 2020, pp. 2031-2063).*

International Search Report and Written Opinion—PCT/US2021/072210—ISA/EPO—Feb. 28, 2022.

Prakash S., et al., "Coded Computing for Low-Latency Federated Learning over Wireless Edge Networks", arxiv.org, Cornell University Library, 201 OLIN Library Cornell University Ithaca, IEEE Journal On Selected Areas In Communications, vol. 39, No. 1, Jan. 2021, NY 14853, Nov. 12, 2020 (Nov. 12, 2020), XP081812364, 18 Pages, DOI: 10.1109/JSAC.2020.3036961, p. 1-p. 6 p. 9.

Co-pending U.S. Appl. No. 17/111,470, inventor Pezeshki; Hamed, filed Dec. 3, 2020.

* cited by examiner

WIRELESS SIGNALING IN FEDERATED LEARNING FOR MACHINE LEARNING COMPONENTS

INTRODUCTION

Aspects of the present disclosure generally relate to wireless communication and to techniques and apparatuses for wireless signaling in federated learning.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a base station includes transmitting, to a user equipment (UE), a federated learning configuration. The federated learning configuration may indicate one or more parameters of a federated learning procedure associated with a machine learning component. The method also may include receiving a local update associated with the machine learning component from the UE based at least in part on the federated learning configuration.

In some aspects, a method of wireless communication performed by a UE includes receiving, from a base station, a federated learning configuration. The federated learning configuration may indicate one or more parameters of a federated learning procedure associated with a machine learning component. The method also may include transmitting a local update associated with the machine learning component to the base station based at least in part on the federated learning configuration.

In some aspects, a base station for wireless communication includes a memory and one or more processors coupled to the memory. The memory and the one or more processors may be configured to transmit, to a E, a federated learning configuration. The federated learning configuration may indicate one or more parameters of a federated learning procedure associated with a machine learning component. The memory and the one or more processors may be further configured to receive a local update associated with the machine learning component from the UE based at least in part on the federated learning configuration.

In some aspects, a UE for wireless communication includes a memory and one or more processors coupled to the memory. The memory and the one or more processors may be configured to receive, from a base station, a federated learning configuration. The federated learning configuration may indicate one or more parameters of a federated learning procedure associated with a machine learning component. The memory and the one or more processors may be further configured to transmit a local update associated with the machine learning component to the base station based at least in part on the federated learning configuration.

In some aspects, a non-transitory computer-readable medium storing a set of instructions for wireless communication includes one or more instructions that, when executed by one or more processors of a base station, cause the base station to transmit, to a UE, a federated learning configuration. The federated learning configuration may indicate one or more parameters of a federated learning procedure associated with a machine learning component. The one or more instructions may further cause the base station to receive a local update associated with the machine learning component from the UE based at least in part on the federated learning configuration.

In some aspects, a non-transitory computer-readable medium storing a set of instructions for wireless communication includes one or more instructions that, when executed by one or more processors of a UE, cause the UE to receive, from a base station, a federated learning configuration. The federated learning configuration may indicate one or more parameters of a federated learning procedure associated with a machine learning component. The one or more instructions may further cause the UE to transmit a local update associated with the machine learning component to the base station based at least in part on the federated learning configuration.

In some aspects, an apparatus for wireless communication includes means for transmitting, to a UE, a federated learning configuration. The federated learning configuration may indicate one or more parameters of a federated learning procedure associated with a machine learning component.

The apparatus may further include means for receiving a local update associated with the machine learning component from the UE based at least in part on the federated learning configuration.

In some aspects, an apparatus for wireless communication includes means for receiving, from a base station, a federated learning configuration that indicates one or more parameters of a federated learning procedure associated with a machine learning component. The apparatus may further include means for transmitting a local update associated with the machine learning component to the base station based at least in part on the federated learning configuration.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
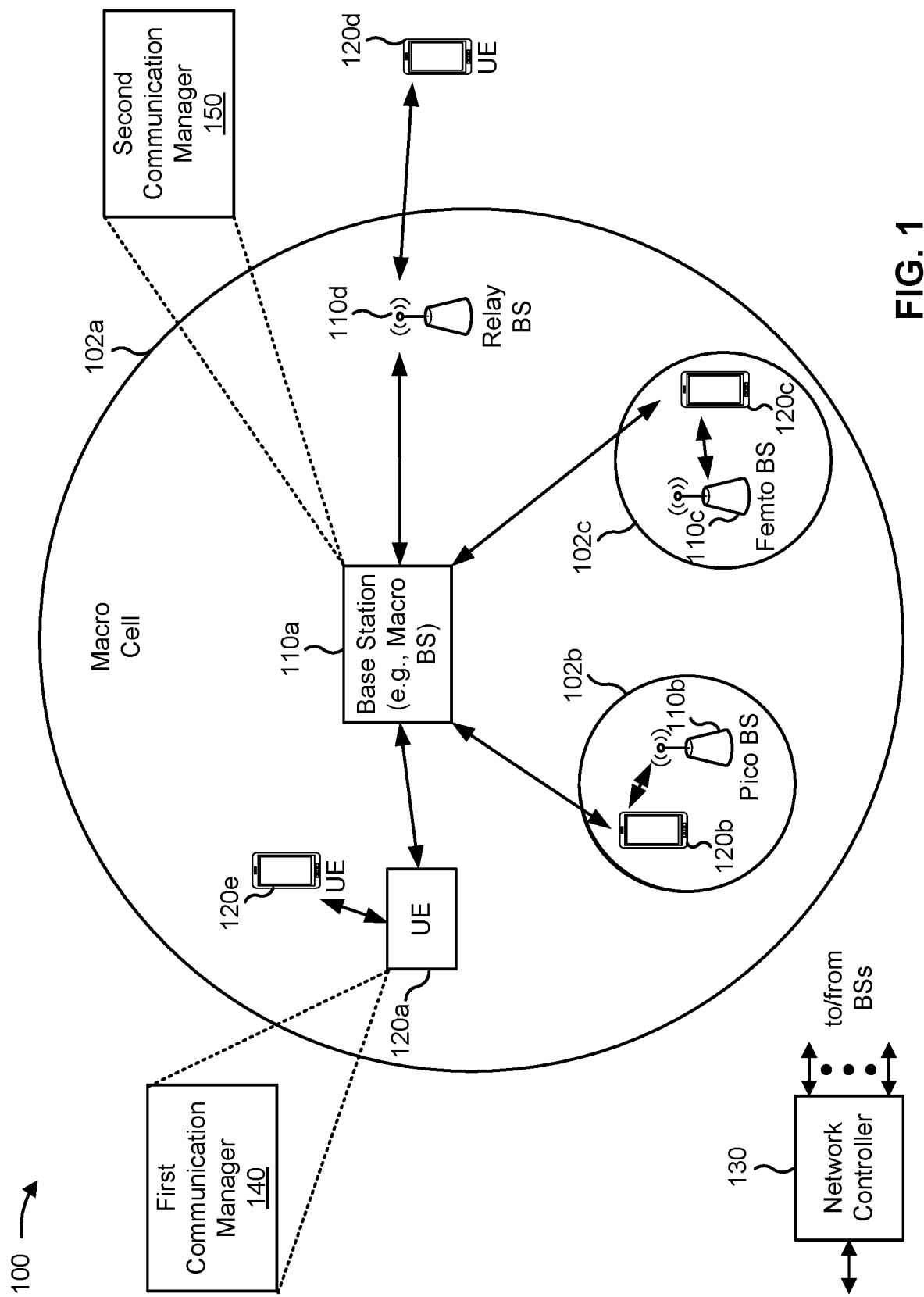
FIG. 1 is a diagram illustrating an example of a wireless network, in accordance with various aspects of the present disclosure.

Machine learning components are being used more and more to perform a variety of different types of operations. A machine learning component is a software component of a device (e.g., a client device, a server device, a UE, a base station, etc.) that performs one or more machine learning procedures and/or that works with one or more other software and/or hardware components to perform one or more machine learning procedures. In one or more examples, a machine learning component may include, for example, software that may learn to perform a procedure without being explicitly trained to perform the procedure. A machine learning component may include, for example, a feature learning processing block (e.g., a software component that facilitates processing associated with feature learning) and/or a representation learning processing block (e.g., a software component that facilitates processing associated with representation learning). A machine learning component may include one or more neural networks, one or more classifiers, and/or one or more deep learning models, among other examples.

In one or more examples, machine learning components may be distributed in a network. For example, a server device may provide a machine learning component to one or more client devices. The machine learning component may be trained using federated learning. Federated learning is a machine learning technique that enables multiple clients to collaboratively train machine learning components. In federated learning, a client device may use local training data to perform a local training operation associated with the machine learning component. For example, the client device may use local training data to train the machine learning component. Local training data is training data that is generated by, collected by, and/or stored at the client device.

A client device may generate a local update associated with the machine learning component based at least in part on the local training operation. A local update is information associated with the machine learning component that reflects a change to the machine learning component that occurs as a result of the local training operation. For example, a local update may include the locally updated machine learning component (e.g., updated as a result of the local training operation), data indicating one or more aspects (e.g., parameter values, output values, weights) of the locally updated machine learning component, a set of gradients associated with a loss function corresponding to the locally updated machine learning component, a set of parameters (e.g., neural network weights) corresponding to the locally updated machine learning component, and/or the like.

In federated learning, the client device may provide the local update to the server device. The server device may collect local updates from one or more client devices and use those local updates to update a copy of the machine learning component that is maintained at the server device. An update associated with the machine learning component that is maintained at the server device may be referred to as a global update. A global update is information associated with the machine learning component that reflects a change to the machine learning component that occurs based at least in part on one or more local updates and/or a server update. A server update is information associated with the machine learning component that reflects a change to the machine learning component that occurs as a result of a training operation performed by the server device. In one or more examples, a server device may generate a global update by aggregating a number of local updates to generate an aggregated update and applying the aggregated update to the machine learning component. The server device may provide the global update to the client device or devices.

A client device may apply a local update to the machine learning component received from the server device (e.g., on which a global update may have been performed in a previous federated learning round). In this way, a number of client devices may be able to contribute to the training of a machine learning component and a server device may be able to distribute global updates so that each client device maintains a current, updated version of the machine learning component. Federated learning also may facilitate privacy of training data since the server device may generate global updates based on local updates and without collecting training data from client devices.

The exchange of information in this type of federated learning may be done over WiFi connections, where limited and/or costly communication resources are not of concern due to wired connections associated with modems, routers, and/or the like. However, being able to implement federated learning for machine learning components in the cellular context may enable positive impacts in network performance and user experience. In the cellular context, for example, a server device may include, or be included in a base station; and a client device may be, include, or be included in a UE.

Aspects of the techniques and apparatuses described herein may facilitate wireless signaling for federated learning of machine learning components. In some aspects, a UE may receive a machine learning component from a base station and may locally train the machine learning component to determine a local update associated with the machine learning component. In some aspects, the base station may provide, to the UE, a federated learning configuration that indicates one or more parameters of a federated learning procedure associated with the machine learning component.

The federated learning configuration may indicate a deadline for providing an update associated with the machine learning component. The deadline may include an ending time of a local training time period. The local training time period may include a period of time during which the UE may train the machine learning component. In some aspects, configuring the deadline may enable the base station to facilitate federated learning among a plurality of UEs because the base station may be able to receive updates from the UEs according to a predictable schedule. In this way, aspects of the techniques and apparatuses described herein may result in positive impacts on network performance, user experience, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, "NTN" may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations, IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a first communication manager 140. As described in more detail elsewhere herein, the first communication manager 140 may receive, from a base station, a federated learning configuration that indicates one or more parameters of a federated learning procedure associated with a machine learning component; and transmit the update to the base station based at least in part on the federated learning configuration. Additionally, or alternatively, the first communication manager 140 may perform one or more other operations described herein.

In some aspects, the base station 110 may include a second communication manager 150. As described in more detail elsewhere herein, the second communication manager 150 may transmit, to a UE, a federated learning configuration that indicates one or more parameters of a federated learning procedure associated with a machine learning component; and receive the update from the UE based at least in part on the federated learning configuration. Additionally, or alternatively, the second communication manager 150 may perform one or more other operations described herein.

As indicated above, FIG. 1 is provided merely as an example. Other examples may differ from what is described with regard to FIG. 1.

Figure 2:
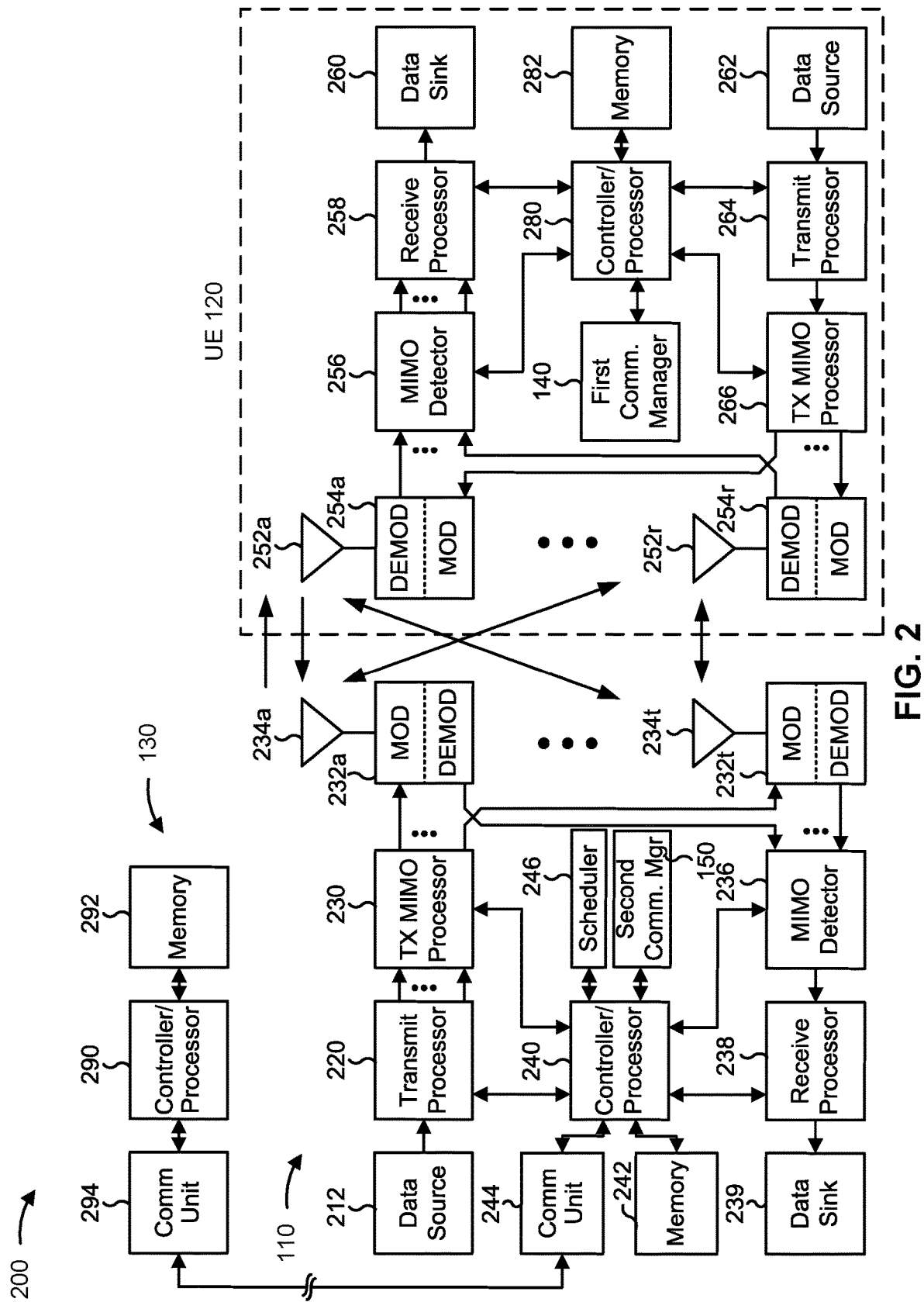
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor"

may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with wireless signaling in federated learning, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, interpreting the instructions, and/or the like.

In some aspects, the UE 120 may include means for receiving, from a base station, a federated learning configuration that indicates one or more parameters of a federated learning procedure associated with a machine learning component, means for transmitting the update to the base station based at least in part on the federated learning configuration, and/or the like. Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, the base station 110 may include means for transmitting, to a UE, a federated learning configuration that indicates one or more parameters of a federated learning procedure associated with a machine learning component, means for receiving the update from the UE based at least in part on the federated learning configuration, and/or the like. Additionally, or alternatively, the base station 110 may include means for performing one or more other operations described herein. In some aspects, such means may include the communication manager 150. In some aspects, such means may include one or more other components of the base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
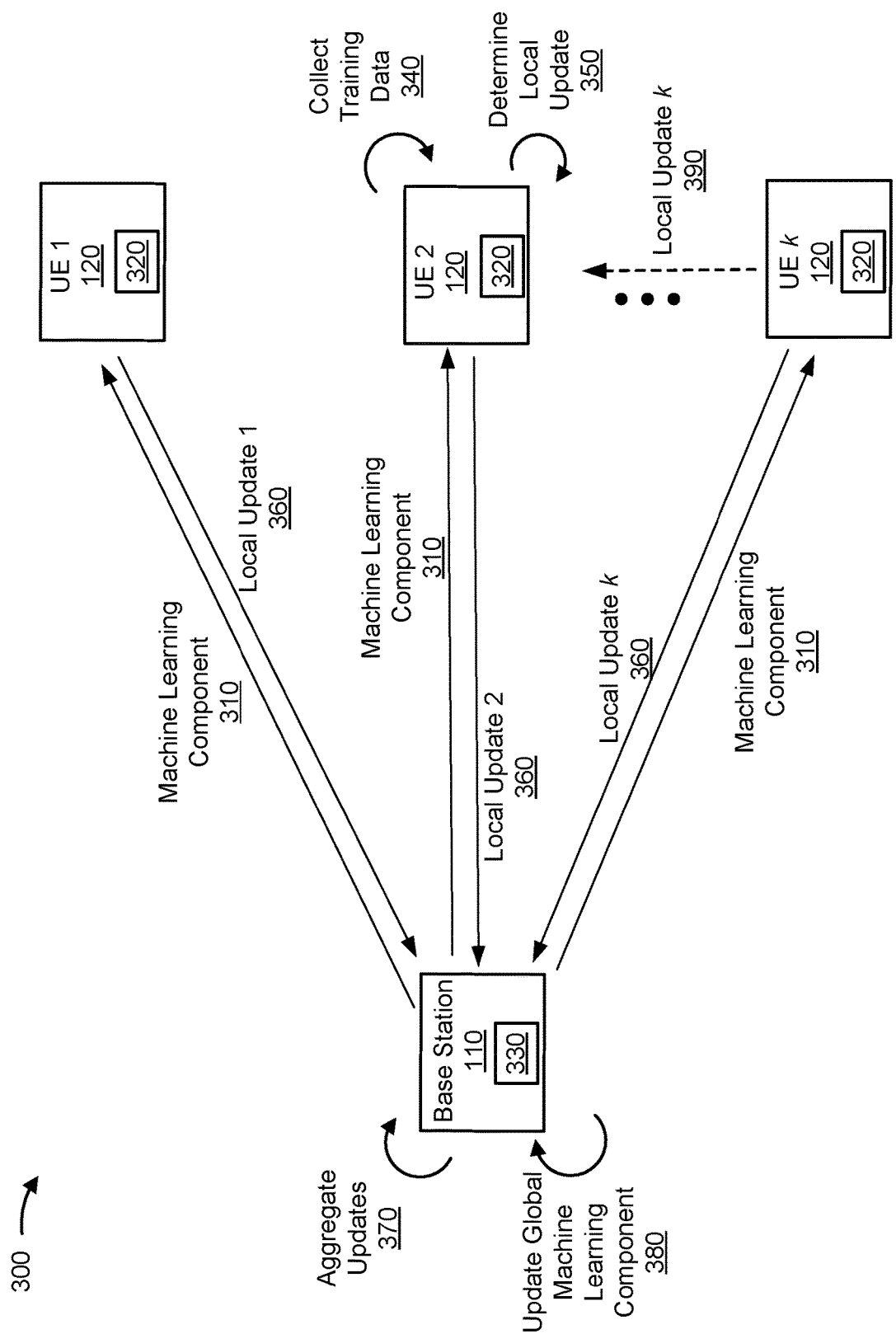
FIG. 3 is a diagram illustrating an example of federated learning for machine learning components, in accordance with various aspects of the present disclosure.

FIG. 3 is a diagram illustrating an example 300 of federated learning for machine learning components, in accordance with various aspects of the present disclosure. As shown, a base station 110 may communicate with a set of K UEs 120 (shown as "UE 1, UE 2, . . . , and UE k"). The base station 110 and the UEs 120 may communicate with one another via a wireless network (e.g., the wireless network 100 shown in FIG. 1). In some aspects, any number of additional UEs 120 may be included in the set of K UEs 120.

As shown by reference number 310, the base station 110 may transmit a machine learning component to the UE 1, the UE 2, and the UE k. As shown, the UEs 120 may include a first communication manager 320, which may be, or be similar to, the first communication manager 140 shown in FIG. 1. The first communication manager 320 may be configured to utilize the machine learning component to perform one or more wireless communication tasks and/or one or more user interface tasks. The first communication manager 320 may be configured to utilize any number of additional machine learning components.

As shown in FIG. 3, the base station 110 may include a second communication manager 330, which may be, or be similar to, the second communication manager 150 shown in FIG. 1. The second communication manager 330 may be configured to utilize a global machine learning component to perform one or more wireless communication operations, to perform one or more user interface operations, and/or to facilitate federated learning associated with the machine learning component.

The UEs 120 may locally train the machine learning component using training data collected by the UEs, respectively. A UE 120 may train a machine learning component such as a neural network by optimizing a set of model parameters, $w^{(n)}$, associated with the machine learning component, where n is the federated learning round index. The set of UEs 120 may be configured to provide local updates to the base station 110 multiple times (e.g., periodically, on demand, upon updating a local machine learning component, etc.).

A federated learning round refers to the training done by a UE 120 that corresponds to a local update provided by the UE 120 to the base station 110. In some aspects, "federated learning round" may refer to the transmission by a UE 120, and the reception by the base station 110, of a local update. The federated learning round index n indicates the number of the rounds since the last global update was transmitted by the base station 110 to the UE 120. The initial provisioning of a machine learning component on a UE 120, the transmission of a global update to the machine learning component to a UE 120, and/or the like may trigger the beginning of a new round of federated learning.

In some aspects, for example, the first communication manager 320 of the UE 120 may determine a local update corresponding to the machine learning component by training the machine learning component. In some aspects, as shown by reference number 340, the UEs 120 may collect training data and store it in a memory device. In one example, the stored training data may be referred to as a "local dataset." As shown by reference number 350, the UEs 120 may determine a local update associated with the machine learning component.

In some aspects, for example, the first communication manager 320 may access training data from the memory device and use the training data to determine an input vector, $x_j$, to be input into the machine learning component to generate a training output, $y_j$, from the machine learning component. The input vector $x_j$ may include an array of input values and the training output $y_j$ may include a value (e.g., a value between 0 and 9).

The training output $y_j$ may be used to facilitate determining the model parameters $w^{(n)}$ that maximize a variational lower bound function. A negative variational lower bound function, which is the negative of the variational lower bound function, may correspond to a local loss function, $F_k$ (W) which may be expressed as:

$$F_k(w) = \frac{1}{|D_k|} \sum_{(x_j, y_j) \in D_k} f(w, x_j, y_j),$$

where $|D_k|$ is the size of the local dataset associated with the UE k. A stochastic gradient descent (SGD) algorithm may be used to optimize the model parameters $w^{(n)}$. The first communication manager 320 may perform one or more SGD procedures to determine the optimized parameters $w^{(n)}$ and may determine the gradients, $g_k^{(n)} = \nabla F_k(w^{(n)})$, of the loss function F(w). The first communication manager 320 may further refine the machine learning component based at least in part on the loss function value, the gradients, and/or the like.

By repeating this process of training the machine learning component to determine the gradients $g_k^{(n)}$ a number of times, the first communication manager 320 may determine a local update corresponding to the machine learning component. Each repetition of the training procedure described above may be referred to as an epoch. In some aspects, the local update may include an updated set of model parameters $w^{(n)}$, a difference between the updated set of model parameters $w^{(n)}$ and a prior set of model parameters $w^{(n-1)}$, one or more gradients of the set of gradients $g_k^{(n)}$, an updated machine learning component (e.g., an updated neural network model), and/or the like.

As shown by reference number 360, the UEs 120 may transmit their respective local updates (shown as "local update 1, local update 2, . . . , local update k"). In some aspects, the local update may include a compressed version of a local update. For example, in some aspects, a UE 120 may transmit a compressed set of gradients, $\tilde{g}_k^{(n)} = q(g_k^{(n)})$, where q represents a compression scheme applied to the set of gradients $g_k^{(n)}$.

As shown by reference number 370, the base station 110 (e.g., using the second communication manager 330) may aggregate the local updates received from the UEs 120. For example, the second communication manager 330 may average the received gradients to determine an aggregated update, which may be expressed as $$g^{(n)} = \frac{1}{K} \sum_{k=1}^{K} \tilde{g}_k^{(n)},$$

where, as explained above, K is the total number of UEs 120 from which updates were received. In some examples, the second communication manager 330 may aggregate the received local updates using any number of other aggregation techniques. As shown by reference number 380, the second communication manager 330 may update the global machine learning component based on the aggregated updates. In some aspects, for example, the second communication manager 330 may update the global machine learning component by normalizing the local datasets by treating each dataset size, $|D_k|$, as being equal. The second communication manager 330 may update the global machine learning component using multiple rounds of updates from the UEs 120 until a global loss function is minimized. The global loss function may be given, for example, by:

$$F(w) = \frac{\sum_{k=1}^{K} \sum_{j \in D_k} f_j(w)}{K * D} = \frac{1}{K} \sum_{k=1}^{K} F_k(w),$$

where $|D_k|$=D, and where D is a normalized constant. In some aspects, the base station 110 may transmit an update associated with the updated global machine learning component to the UEs 120.

The exchange of information in this type of federated learning is often done over WiFi connections, where limited and/or costly communication resources are not of concern due to wired connections associated with modems, routers, and/or the like. However, being able to implement federated learning for machine learning components in the cellular context may enable positive impacts in network performance and user experience.

Aspects of the techniques and apparatuses described herein may facilitate wireless signaling for federated learning of machine learning components. In some aspects, a UE 120 may receive a machine learning component from a base station 110 and may locally train the machine learning component to determine a local update associated with the machine learning component. In some aspects, the base station 110 may provide a federated learning configuration to the UE 120. The federated learning configuration may indicate one or more parameters of a federated learning procedure associated with the machine learning component. The federated learning configuration may indicate a deadline for providing an update associated with the machine learning component. The deadline may include an ending time of a local training time period. The local training time period may include a period of time during which the UE 120 may train the machine learning component. In some aspects, configuring the deadline may enable the base station 110 to facilitate federated learning among a plurality of UEs 120 because the base station 110 may be able to receive updates from the UEs 110 according to a predictable schedule. In this way, aspects of the techniques and apparatuses described herein may result in positive impacts on network performance, user experience, and/or the like.

As indicated above, FIG. 3 is provided merely as an example. Other examples may differ from what is described with regard to FIG. 3.

Figure 4:
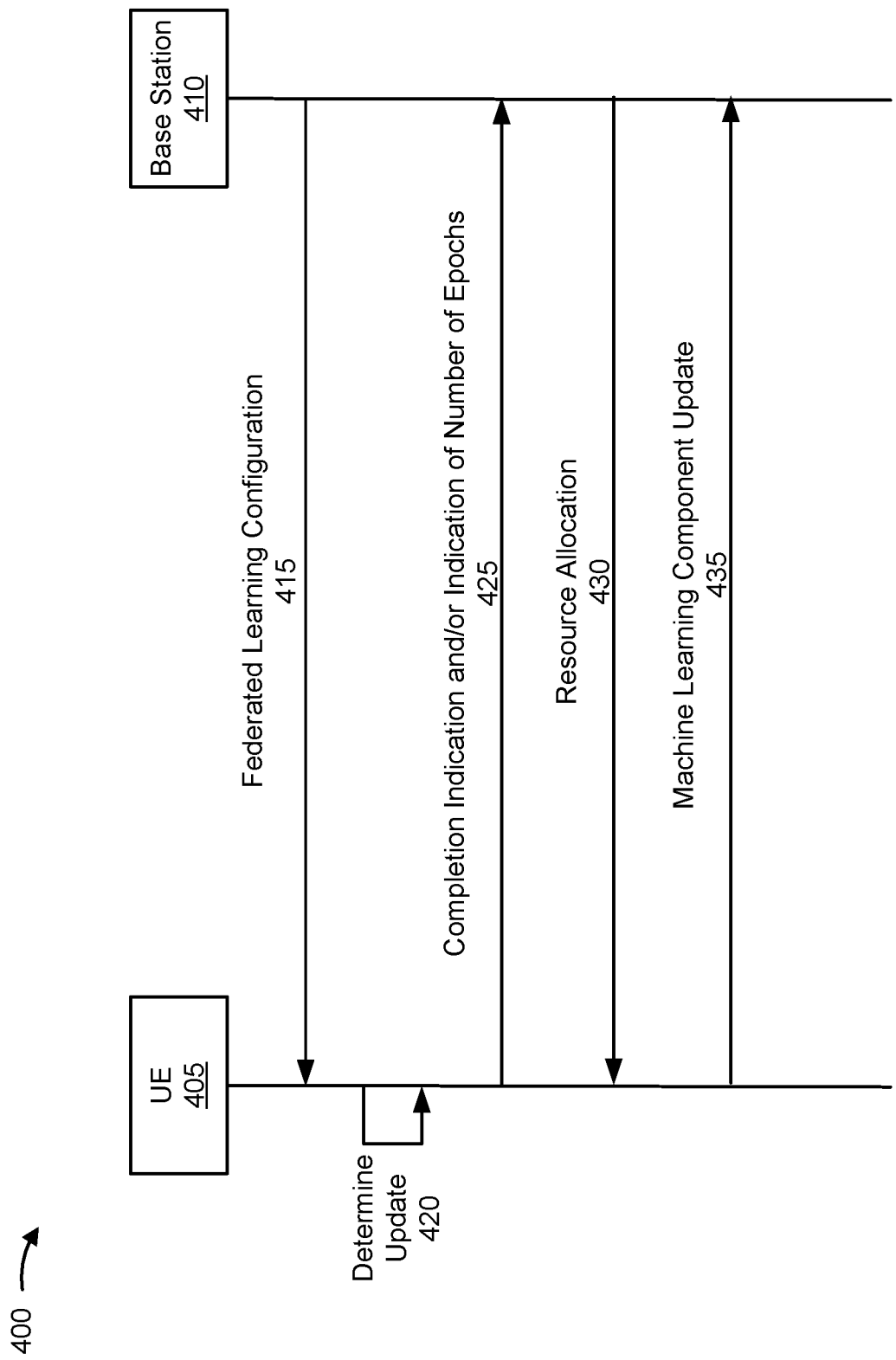
FIG. 4 is a diagram illustrating an example associated with wireless signaling in federated learning, in accordance with various aspects of the present disclosure.

FIG. 4 is a diagram illustrating an example 400 of machine learning component management in federated learning, in accordance with various aspects of the present disclosure. As shown, UE 405 and a base station 410 may communicate with one another. In some aspects, the UE 405 may be, be similar to, include, or be included in the UE 120 shown in FIGS. 1-3. In some aspects, the base station 410 may be, be similar to, include, or be included in the base station 110 shown in FIGS. 1-3.

As shown by reference number 415, the base station 410 may transmit, and the UE 405 may receive, a federated learning configuration. The federated learning configuration may be carried, for example, in a radio resource control (RRC) message. In some aspects, the federated learning configuration may be transmitted by an application layer of the base station 410 and/or may originate from an application layer of the base station 410. In some aspects, the federated learning configuration may be transmitted by, and/or originate from, a core network component and/or any number of different functions of the core network.

The federated learning configuration may indicate one or more parameters of a federated learning procedure associated with a machine learning component. The one or more parameters of the federated learning procedure may include any parameters that may define the operation of the federated learning procedure. The one or more parameters may include a deadline for providing a local update associated with a machine learning component. The deadline may include an ending time of a local training time period. The local training time period may include a period of time during which the UE 405 trains a machine learning component. The machine learning component may include, for example, at least one neural network model. In some aspects, the federated learning configuration may indicate a local loss function corresponding to the machine learning component. In some aspects, the local update may include a gradient vector associated with the local loss function corresponding to the machine learning component.

In some aspects, the federated learning configuration may indicate a number of training epochs to be performed by the UE 405 during the local training time period. In aspects in which the number of training epochs is greater than one, the federated learning configuration may indicate a learning rate. The learning rate is a parameter that indicates the amount that the parameters $w^{(n)}$ are to be adjusted with respect to the gradients after an epoch and for an immediately following epoch. For example, a new parameter (e.g., neural network weight) may be computed by subtracting a product of the corresponding gradient and the learning rate from the existing parameter. In some aspects, the learning rate may be indicated as a function of the number of training epochs.

In some aspects, the federated learning configuration may indicate a compression scheme to be used to compress the local update for transmission. In some aspects, the compression scheme may be indicated by indicating a type of quantization to be used. In some aspects, the compression scheme may be indicated by one or more parameters associated therewith. For example, the compression scheme may be indicated by indications of a minimum quantization level, a maximum quantization level, a compression sensing parameter, and/or the like. In some aspects, the federated learning configuration may include a compression scheme mapping that maps a plurality of bitmaps or bitmap patterns to a plurality of compression schemes. In this way, for example, the base station may be able to transmit one of the plurality of bitmaps to the UE 405 to cause the UE 405 to use a corresponding compression scheme.

As shown by reference number 420, the UE 405 may determine an update associated with the machine learning component based at least in part on the training. As shown by reference number 425, the UE 405 may transmit, and the base station 410 may receive, an indication of completion and/or an indication of a number of epochs completed by the UE 405. In some aspects, the number of epochs may be part of the federated learning configuration (415). The base station may set a deadline for gradient uploads and may further set a number of epochs for local training for each federated learning round. If a minimum number of epochs is set by the base station, in some aspects, the UE 405 may not send a local update if the UE 405 has not been able to train the machine learning component for at least that number of epochs for that federated learning round by the configured deadline.

In some aspects, the UE 405 may determine that the UE 405 has performed a configured number of training epochs prior to the deadline, and may transmit a completion indication to the base station 410. The completion indication may indicate that the UE has performed the number of training epochs prior to the deadline. The completion indication may be carried in at least one of a physical uplink control channel (PUCCH) or a medium access control (MAC) control element (CE) (MAC CE). In some aspects, the completion indication may originate from an application layer of the UE 405.

In some aspects, the UE 405 may perform as many training epochs as the UE 405 is capable of performing within the local training period. The UE 405 may transmit an indication of the number of training epochs performed by the UE 405 during the local training period. In some aspects, for example, the UE 405 may receive, from the base station 410, a training start command. The UE 405 may perform the plurality of training epochs based at least in part on the training start command. The UE 405 may perform the epochs until the UE 405 receives a stop command.

In some aspects, the base station 410 may transmit, and the UE 405 may receive, an indication of an additional number of training epochs to be performed by the UE 405 during an additional local training time period that is defined by an additional deadline. The UE 405 may determine that the UE 405 has not performed the additional number of training epochs prior to an additional deadline. The UE 405 may refrain from transmitting an additional update based at least in part on determining that the UE 405 has not performed the additional number of training epochs prior to the additional deadline.

In some aspects, the UE 405 may transmit any number of other types of information. For example, the UE 405 may transmit an indication of at least one of a training dataset size or a training minibatch size. In embodiments, for example, the UE 405 may batch the local training dataset into batches of data to facilitate more efficient epochs. Such batches of data may be referred to as "minibatches." The UE 405 may indicate, to the base station 110, a size of a minibatch or minibatches that are to be used for training. In this way, the base station 110 may take into account any effect or predicted effect that batching may have on resulting gradients when aggregating the update from the UE 405 with other updates. For example, the base station 110 may weight updates during aggregation so that updates that are likely (e.g., based on one or more characteristics of the training procedure used to determine the update, the update itself, etc.) to be more accurate than other updates may be weighted more heavily than the other updates during aggregation.

As shown by reference number 430, the base station 410 may transmit, and the UE 405 may receive a resource allocation for transmitting the update to the base station 410. The resource allocation may include one or more of a time resource, a frequency resource, or a spatial resource. For example, in some aspects, as indicated above, the federated learning configuration may indicate an uplink resource grant for reporting the update. In some aspects, the UE 405 may receive the uplink resource grant based at least in part on an occurrence of the deadline. In some aspects, the resource allocation may be based at least in part on the completion indication.

As shown by reference number 435, the UE 405 may transmit, and the base station 410 may receive, a local machine learning component update. The UE 405 may transmit the local update based at least in part on the resource allocation, the federated learning configuration, and/or the like.

According to various aspects, the signaling described above may have different frequency of occurrence. For example, the transmission of the federated learning configuration shown by reference number 415 may be a low-frequency signaling, such as through radio resource control (RRC) configuration (or re-configuration to update the parameters). In contrast, for example, the determination of the update shown by reference number 420, the transmission of the completion indication and/or indication of number of epochs shown by reference number 425, the transmission of the resource allocation shown by reference number 430 and/or the transmission of the machine learning component update shown by reference number 435 may be performed per federated learning round.

In some aspects, one or more of the events depicted in FIG. 4 may be optional. For example, in some aspects, the signaling shown by reference number 425 may be optional. In some aspects, for example, the signaling shown by reference number 430 may be optional (e.g., if resources are pre-configured). If resources are preconfigured, in some aspects, the signaling shown by reference number 430 may include a low-frequency signaling (e.g., RRC signaling) configuring the UE 405 with uplink periodic/semi-persistent resources for the purpose of update transmission.

In some aspects, the UE 405 may send a scheduling request (SR), asking for resources to upload a local update. For example, the signaling shown by reference number 425 may be part of this scheduling request. In this way, there may be no allocated uplink resources if the UE 405 does not have a local update to provide for that federated learning round.

In some aspects, uplink resources may be preconfigured. For example, in some aspects, the uplink resources may be configured just before the deadlines for uploading updates. If the resources are preconfigured, the UE 405 may send local updates in those resources if the UE 405 has completed a specified training operation on the machine learning component prior to occurrence of the resources. In some aspects, for example, if the UE 405 is not done with the training operation, the UE 405 may not send anything in those preconfigured resources, and the resources may be unused for that federated learning round. In some aspects, these preconfigured uplink resources may be periodic or semi-persistent. For example, in some aspects, the resources may include a configured grant (CG) for uplink.

As indicated above, FIG. 4 is provided merely as an example. Other examples may differ from what is described with regard to FIG. 4.

Figure 5:
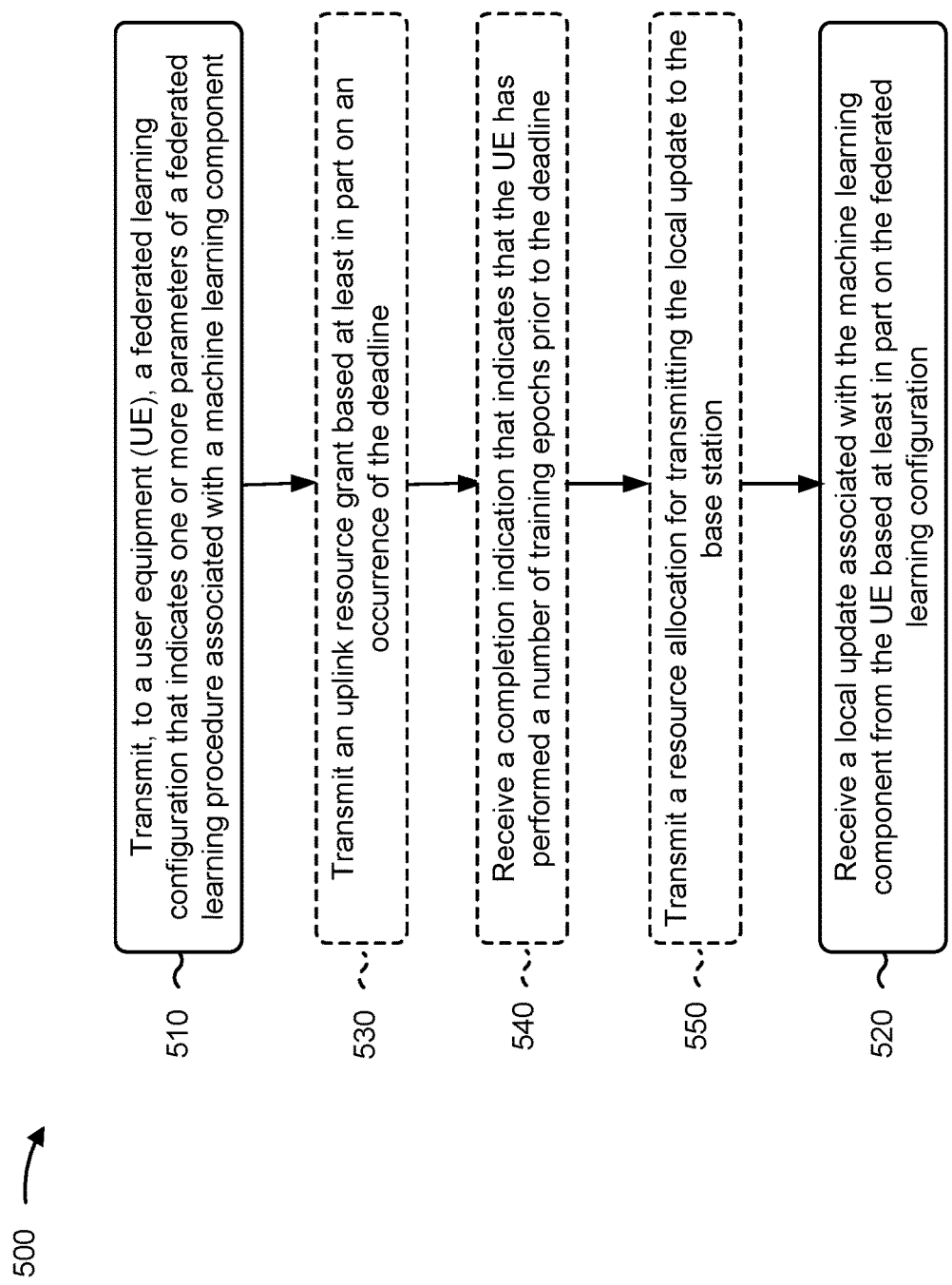
FIG. 5 is a diagram illustrating an example process performed by a base station associated with wireless signaling in federated learning, in accordance with various aspects of the present disclosure.

FIG. 5 is a diagram illustrating an example process 500 performed, for example, by a base station, in accordance with various aspects of the present disclosure. Example process 500 is an example where the base station (e.g., base station 410) performs operations associated with wireless signaling in federated learning for machine learning components.

As shown in FIG. 5, in some aspects, process 500 may include transmitting, to a UE, a federated learning configuration that indicates one or more parameters of a federated learning procedure associated with a machine learning component (block 510). For example, the base station (e.g., using transmission component 1006, depicted in FIG. 10) may transmit, to a UE, a federated learning configuration that indicates one or more parameters of a federated learning procedure associated with a machine learning component, as described above.

As further shown in FIG. 5, in some aspects, process 500 may include receiving a local update associated with the machine learning component from the UE based at least in part on the federated learning configuration (block 520). For example, the base station (e.g., using reception component 1002, depicted in FIG. 10) may receive an update associated with the machine learning component from the UE based at least in part on the federated learning configuration, as described above.

Process 500 may include additional aspects, such as any single aspect or any combination of aspects described below and/or in connection with one or more other processes described elsewhere herein.

In a first aspect, the local update comprises a gradient vector associated with a local loss function corresponding to the machine learning component.

In a second aspect, alone or in combination with the first aspect, the federated learning configuration further indicates a deadline for providing the local update, wherein the deadline comprises an ending time of a local training time period.

In a third aspect, alone or in combination with the second aspect, the federated learning configuration indicates the deadline by indicating an uplink resource grant for reporting the local update.

In a fourth aspect, alone or in combination with one or more of the second or third aspects, process 500 includes transmitting an uplink resource grant, wherein transmitting the uplink resource grant comprises transmitting the uplink resource grant based at least in part on an occurrence of the deadline (block 530).

In a fifth aspect, alone or in combination with one or more of the first through fourth aspects, the federated learning configuration further indicates a learning rate.

In a sixth aspect, alone or in combination with one or more of the first through fifth aspects, the federated learning configuration indicates a local loss function corresponding to the machine learning component.

In a seventh aspect, alone or in combination with one or more of the first through sixth aspects, the federated learning configuration indicates a compression scheme to be used to compress the local update for transmission.

In an eighth aspect, alone or in combination with one or more of the first through seventh aspects, the federated learning configuration further indicates a number of training epochs to be performed by the UE during a local training time period.

In a ninth aspect, alone or in combination with the eighth aspect, process 500 includes receiving a completion indication from the UE, wherein the completion indication indicates that the UE has performed the number of training epochs prior to a deadline (block 540).

In a tenth aspect, alone or in combination with one or more of the first through ninth aspects, the completion indication is carried in at least one of a physical uplink control channel or a MAC-CE.

In an eleventh aspect, alone or in combination with one or more of the ninth or tenth aspects, process 500 includes transmitting a resource allocation for transmitting the local update to the base station, wherein the resource allocation is based at least in part on the completion indication, and wherein receiving the update comprises receiving the local update based at least in part on the resource allocation (block 550).

In a twelfth aspect, alone or in combination with one or more of the first through eleventh aspects, process 500 includes receiving an indication of a number of training epochs performed by the UE during a local training period.

In a thirteenth aspect, alone or in combination with one or more of the first through twelfth aspects, process 500 includes transmitting a training start command, and transmitting a training stop command.

In a fourteenth aspect, alone or in combination with one or more of the first through thirteenth aspects, the federated learning configuration is carried in a radio resource control message.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
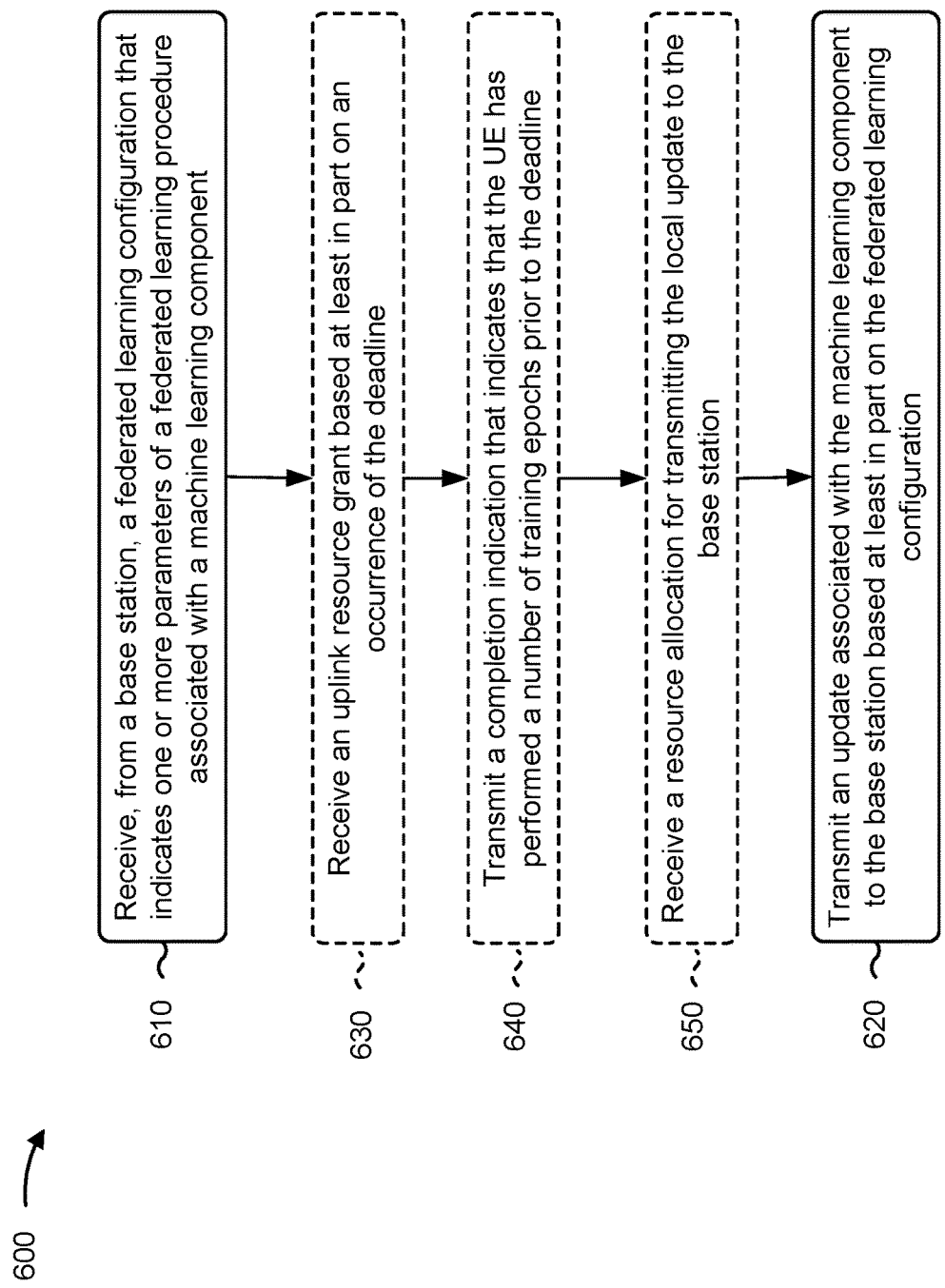
FIG. 6 is a diagram illustrating an example process performed by a UE associated with wireless signaling in federated learning, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 405) performs operations associated with wireless signaling in federated learning for machine learning components.

As shown in FIG. 6, in some aspects, process 600 may include receiving, from a base station, a federated learning configuration that indicates one or more parameters of a federated learning procedure associated with a machine learning component (block 610). For example, the UE (e.g., using reception component 702, depicted in FIG. 7) may receive, from a base station, a federated learning configuration that indicates one or more parameters of a federated learning procedure associated with a machine learning component, as described above.

As further shown in FIG. 6, in some aspects, process 600 may include transmitting a local update associated with the machine learning component to the base station based at least in part on the federated learning configuration (block 620). For example, the UE (e.g., using transmission component 706, depicted in FIG. 7) may transmit a local update associated with the machine learning component to the base station based at least in part on the federated learning configuration, as described above.

Process 600 may include additional aspects, such as any single aspect or any combination of aspects described below and/or in connection with one or more other processes described elsewhere herein.

In a first aspect, the federated learning configuration further indicates a deadline for providing the local update, wherein the deadline comprises an ending time of a local training time period.

In a second aspect, alone or in combination with the first aspect, the federated learning configuration indicates the deadline by indicating an uplink resource grant for reporting the local update.

In a third aspect, alone or in combination with one or more of the first and second aspects, process 600 includes receiving an uplink resource grant, wherein receiving the uplink resource grant comprises receiving the uplink resource grant based at least in part on an occurrence of the deadline (block 630).

In a fourth aspect, alone or in combination with one or more of the first through third aspects, the federated learning configuration further indicates a learning rate.

In a fifth aspect, alone or in combination with one or more of the first through fourth aspects, the federated learning configuration indicates a compression scheme to be used to compress the local update for transmission.

In a sixth aspect, alone or in combination with one or more of the first through fifth aspects, the federated learning configuration further indicates a number of training epochs to be performed by the UE during a local training time period.

In a seventh aspect, alone or in combination with the sixth aspect, process 600 includes determining that the UE has performed the number of training epochs prior to a deadline, and transmitting a completion indication to the base station, wherein the completion indication indicates that the UE has performed the number of training epochs prior to the deadline (block 640).

In an eighth aspect, alone or in combination with the seventh aspect, process 600 includes receiving a resource allocation for transmitting the local update to the base station, wherein the resource allocation is based at least in part on the completion indication, wherein transmitting the update comprises transmitting the local update based at least in part on the resource allocation (block 650).

In a ninth aspect, alone or in combination with one or more of the sixth through eighth aspects, the local training period is defined by a deadline, and process 600 includes receiving an indication of an additional number of training epochs to be performed by the UE during an additional local training time period that is defined by an additional deadline, determining that the UE has not performed the additional number of training epochs prior to an additional deadline, and refraining from transmitting an additional local update based at least in part on determining that the UE has not performed the additional number of training epochs prior to the additional deadline.

In a tenth aspect, alone or in combination with one or more of the first through ninth aspects, process 600 includes performing one or more training epochs during a local training period, determining a number of training epochs performed by the UE during the local training period, and transmitting an indication of the number of training epochs performed by the UE during the local training period.

In an eleventh aspect, alone or in combination with one or more of the first through tenth aspects, process 600 includes receiving a training start command, performing a plurality of training epochs based at least in part on the training start command, receiving a training stop command, and stopping performing the plurality of training epochs based at least in part on the training stop command.

In a twelfth aspect, alone or in combination with one or more of the first through eleventh aspects, process 600 includes transmitting an indication of at least one of a training dataset size or a training minibatch size.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
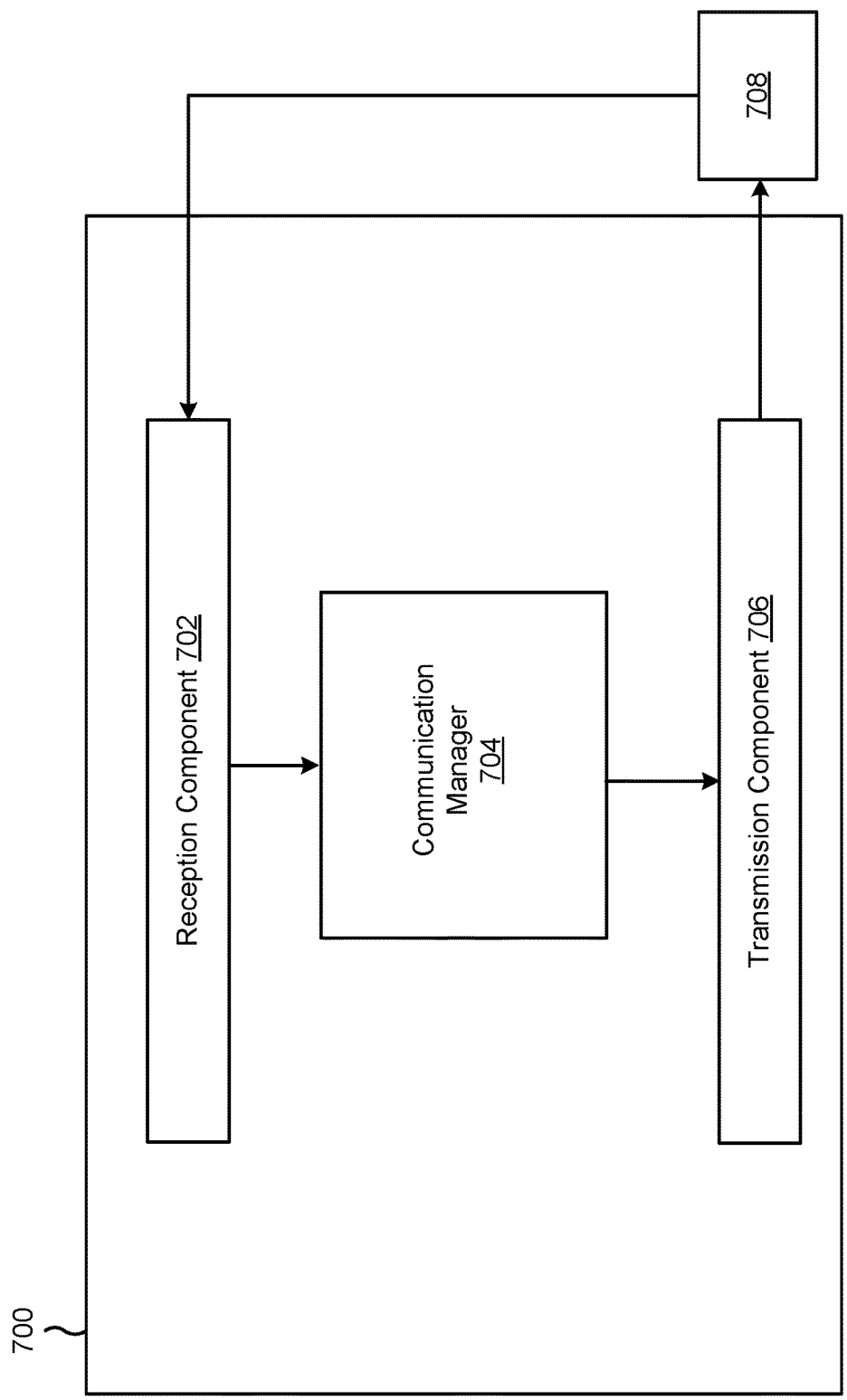
FIGS. 7-9 are block diagrams of an example apparatus for wireless communication at a base station, in accordance with various aspects of the present disclosure.

FIG. 7 is a block diagram of an example apparatus 700 for wireless communication in accordance with various aspects of the present disclosure. The apparatus 700 may be, be similar to, include, or be included in a UE (e.g., UE 405 shown in FIG. 4). In some aspects, the apparatus 700 includes a reception component 702, a communication manager 704, and a transmission component 706, which may be in communication with one another (for example, via one or more buses). As shown, the apparatus 700 may communicate with another apparatus 708 (such as a client, a server, a UE, a base station, or another wireless communication device) using the reception component 702 and the transmission component 706.

In some aspects, the apparatus 700 may be configured to perform one or more operations described herein in connection with FIG. 4. Additionally, or alternatively, the apparatus 700 may be configured to perform one or more processes described herein, such as process 600 of FIG. 6. In some aspects, the apparatus 700 may include one or more components of the first UE described above in connection with FIG. 2.

The reception component 702 may provide means for receiving communications, such as reference signals, control information, data communications, or a combination thereof, from the apparatus 708. The reception component 702 may provide received communications to one or more other components of the apparatus 700, such as the communication manager 704. In some aspects, the reception component 702 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the first UE described above in connection with FIG. 2.

The transmission component 706 may provide means for transmitting communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may provide means for performing signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include one or more antennas, a modulator, a transmit MIMO processor, a transmit processor, a controller/processor, a memory, or a combination thereof, of the first UE described above in connection with FIG. 2. In some aspects, the transmission component 706 may be co-located with the reception component 702 in a transceiver.

In some aspects, the communication manager 704 may provide means for receiving, from a base station, a federated learning configuration that indicates a deadline for providing a local update associated with a machine learning component, wherein the deadline comprises an ending time of a local training time period; and transmitting the local update to the base station based at least in part on the federated learning configuration. In some aspects, the communication manager 704 may include a controller/processor, a memory, or a combination thereof, of the first UE described above in connection with FIG. 2. In some aspects, the communication manager 704 may include the reception component 702, the transmission component 706, and/or the like. In some aspects, the means provided by the communication manager 704 may include, or be included within, means provided by the reception component 702, the transmission component 704, and/or the like.

In some aspects, the communication manager 704 and/or one or more components of the communication manager 704 may include or may be implemented within hardware (e.g., one or more of the circuitry described in connection with FIG. 20). In some aspects, the communication manager 704 and/or one or more components thereof may include or may be implemented within a controller/processor, a memory, or a combination thereof, of the UE 120 described above in connection with FIG. 2.

In some aspects, the communication manager 704 and/or one or more components of the communication manager 704 may be implemented in code (e.g., as software or firmware stored in a memory), such as the code described in connection with FIG. 9. For example, the communication manager 704 and/or a component (or a portion of a component) of the communication manager 704 may be implemented as instructions or code stored in a non-transitory computer-readable medium and executable by a controller or a processor to perform the functions or operations of the communication manager 704 and/or the component. If implemented in code, the functions of the communication manager 704 and/or a component may be executed by a controller/processor, a memory, a scheduler, a communication unit, or a combination thereof, of the UE 120 described above in connection with FIG. 2.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
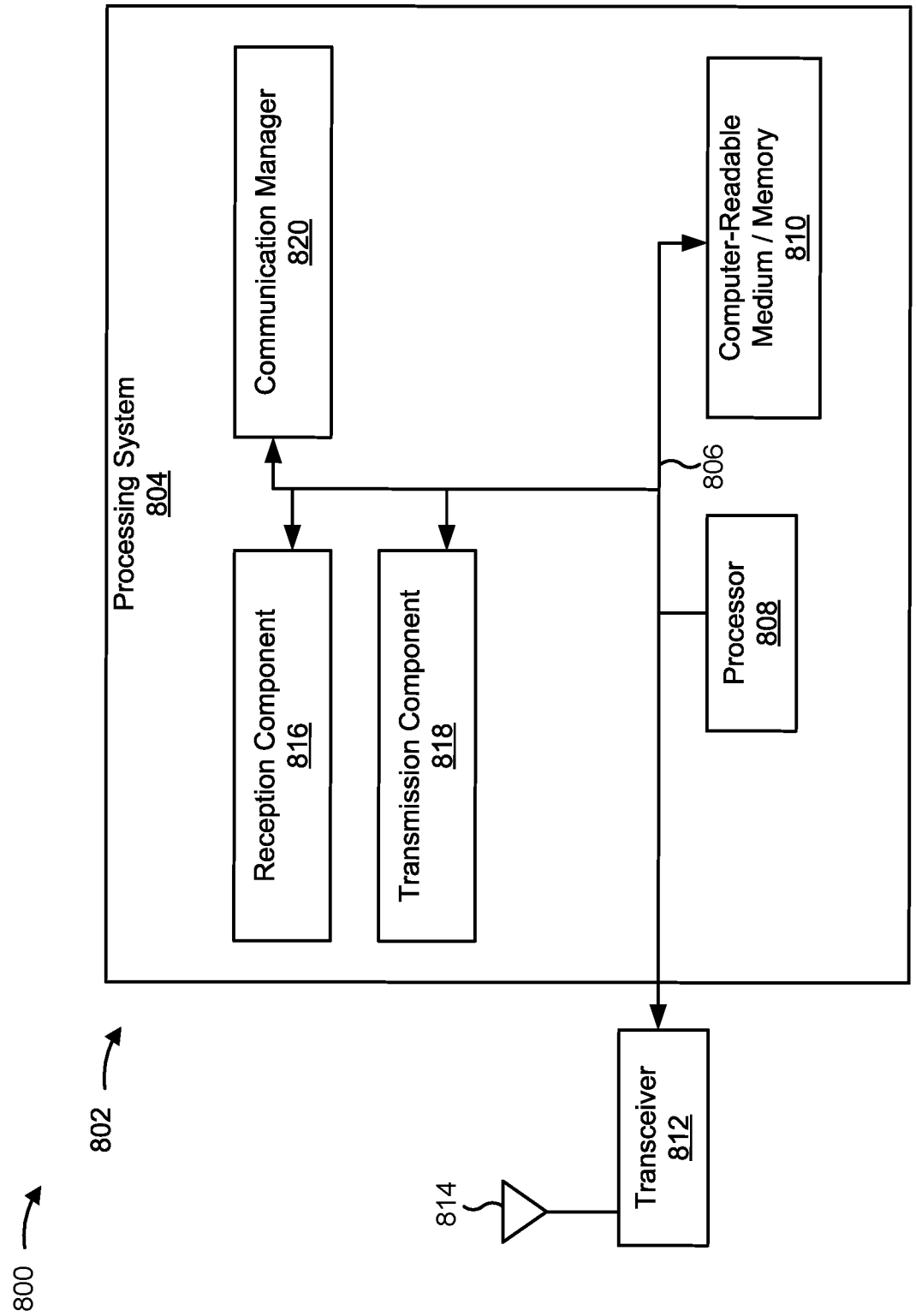

FIG. 8 is a diagram illustrating an example 800 of a hardware implementation for an apparatus 802 employing a processing system 804. The apparatus 802 may be, be similar to, include, or be included in the apparatus 700 shown in FIG. 7.

The processing system 804 may be implemented with a bus architecture, represented generally by the bus 806. The bus 806 may include any number of interconnecting buses and bridges depending on the specific application of the processing system 804 and the overall design constraints. The bus 806 links together various circuits including one or more processors and/or hardware components, represented by a processor 808, the illustrated components, and the computer-readable medium/memory 810. The bus 806 may also link various other circuits, such as timing sources, peripherals, voltage regulators, power management circuits, and/or the like.

The processing system 804 may be coupled to a transceiver 812. The transceiver 812 is coupled to one or more antennas 814. The transceiver 812 provides a means for communicating with various other apparatuses over a transmission medium. The transceiver 812 receives a signal from the one or more antennas 814, extracts information from the received signal, and provides the extracted information to the processing system 804, specifically a reception component 816. In addition, the transceiver 812 receives information from the processing system 804, specifically a transmission component 818, and generates a signal to be applied to the one or more antennas 814 based at least in part on the received information.

The processor 808 is coupled to the computer-readable medium/memory 810. The processor 808 is responsible for general processing, including the execution of software stored on the computer-readable medium/memory 810. The software, when executed by the processor 808, causes the processing system 804 to perform the various functions described herein in connection with a client. The computer-readable medium/memory 810 may also be used for storing data that is manipulated by the processor 808 when executing software. The processing system 804 may include any number of additional components not illustrated in FIG. 8. The components illustrated and/or not illustrated may be software modules running in the processor 808, resident/stored in the computer readable medium/memory 810, one or more hardware modules coupled to the processor 808, or some combination thereof.

In some aspects, the processing system 804 may be a component of the UE 120 and may include the memory 282 and/or at least one of the TX MIMO processor 266, the RX processor 258, and/or the controller/processor 280. In some aspects, the apparatus 802 for wireless communication provides means for receiving, from a base station, a federated learning configuration that indicates a deadline for providing a local update associated with a machine learning component, wherein the deadline comprises an ending time of a local training time period; and transmitting the local update to the base station based at least in part on the federated learning configuration. The aforementioned means may be one or more of the aforementioned components of the processing system 804 of the apparatus 802 configured to perform the functions recited by the aforementioned means. As described elsewhere herein, the processing system 804 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 8 is provided as an example. Other examples may differ from what is described in connection with FIG. 8.

Figure 9:
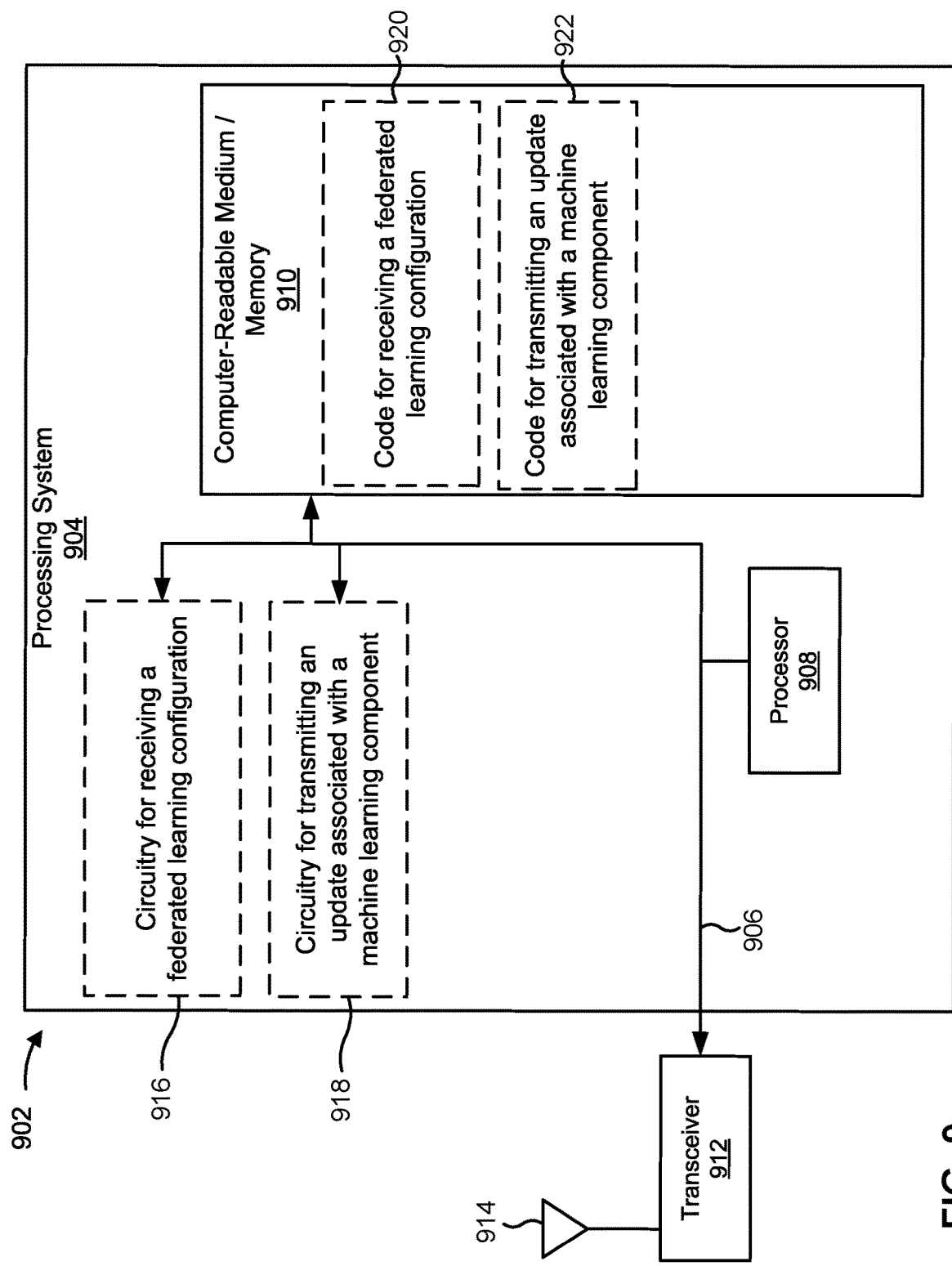

FIG. 9 is a diagram illustrating an example 900 of an implementation of code and circuitry for an apparatus 902 for wireless communication. The apparatus 902 may be, be similar to, include, or be included in the apparatus 802 shown in FIG. 8 and/or the apparatus 700 shown in FIG. 7. The apparatus 902 may include a processing system 904, which may include a bus 906 coupling one or more components such as, for example, a processor 908, computer-readable medium/memory 910, a transceiver 912, and/or the like. As shown, the transceiver 912 may be coupled to one or more antennas 914.

As further shown in FIG. 9, the apparatus 902 may include circuitry for receiving, from a base station, a federated learning configuration that indicates one or more parameters of a federated learning procedure associated with a machine learning component (circuitry 916). For example, the apparatus 902 may include circuitry 916 to enable the apparatus 902 to receive, from a base station, a federated learning configuration that indicates one or more parameters of a federated learning procedure associated with a machine learning component.

As further shown in FIG. 9, the apparatus 902 may include circuitry for transmitting the local update to the base station based at least in part on the federated learning configuration (circuitry 918). For example, the apparatus 902 may include circuitry 918 to enable the apparatus 902 to transmit the local update to the base station based at least in part on the federated learning configuration.

As further shown in FIG. 9, the apparatus 902 may include, stored in computer-readable medium 910, code for receiving, from a base station, a federated learning configuration that indicates one or more parameters of a federated learning procedure associated with a machine learning component (code 920). For example, the apparatus 902 may include code 920 that, when executed by the processor 908, may cause the transceiver 912 to receive, from a base station, a federated learning configuration that indicates one or more parameters of a federated learning procedure associated with a machine learning component.

As further shown in FIG. 9, the apparatus 902 may include, stored in computer-readable medium 910, code for transmitting the local update to the base station based at least in part on the federated learning configuration (code 922). For example, the apparatus 902 may include code 924 that, when executed by the processor 908, may cause the transceiver 912 to transmit the local update to the base station based at least in part on the federated learning configuration.

FIG. 9 is provided as an example. Other examples may differ from what is described in connection with FIG. 9.

Figure 10:
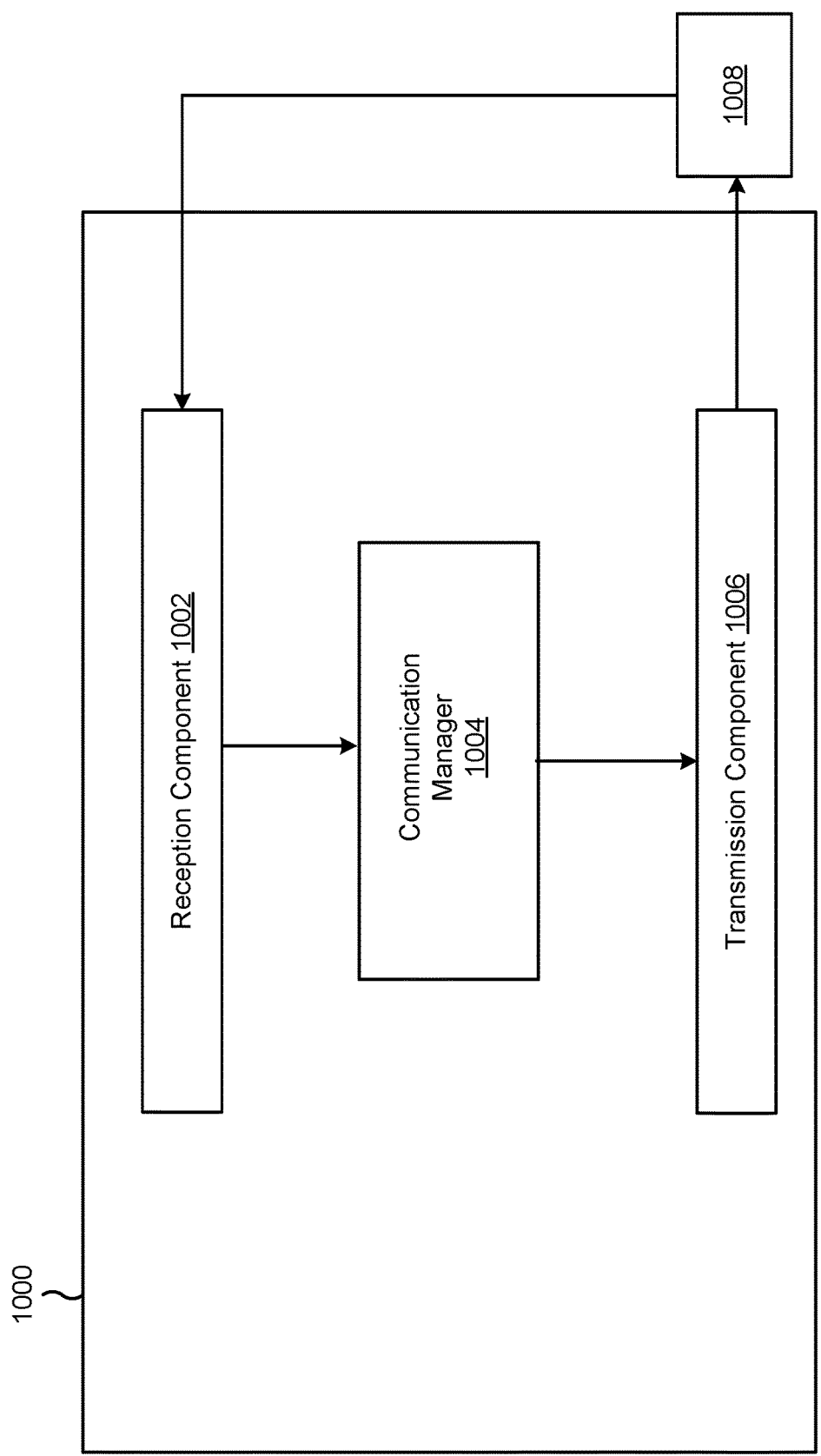
FIGS. 10-12 are block diagrams of an example apparatus for wireless communication at a UE, in accordance with various aspects of the present disclosure.

FIG. 10 is a block diagram of an example apparatus 1000 for wireless communication in accordance with various aspects of the present disclosure. The apparatus 1000 may be, be similar to, include, or be included in a base station (e.g., base station 410 shown in FIG. 4 and/or base station 110 shown in FIGS. 1 and 2). In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a client, a server, a UE, a base station, or another wireless communication device) using the reception component 1002 and the transmission component 1006.

In some aspects, the apparatus 1000 may be configured to perform one or more operations described herein in connection with FIG. 4. Additionally, or alternatively, the apparatus 1000 may be configured to perform one or more processes described herein, such as process 500 of FIG. 5. In some aspects, the apparatus 1000 may include one or more components of the base station described above in connection with FIG. 2.

The reception component 1002 may provide means for receiving communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the base station described above in connection with FIG. 2.

The transmission component 1006 may provide means for transmitting communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may provide means for performing signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the base station described above in connection with FIG. 2. In some aspects, the transmission component 1006 may be co-located with the reception component 1002 in a transceiver.

The communication manager 1004 may provide means for transmitting, to a UE, a federated learning configuration that indicates a deadline for providing a local update associated with a machine learning component, wherein the deadline comprises an ending time of a local training time period; and receiving the local update from the UE based at least in part on the federated learning configuration. In some aspects, the communication manager 1004 may include a controller/processor, a memory, a scheduler, a communication unit, or a combination thereof, of the base station described above in connection with FIG. 2. In some aspects, the communication manager 1004 may include the reception component 1002, the transmission component 1006, and/or the like. In some aspects, the means provided by the communication manager 1004 may include, or be included within means provided by the reception component 1002, the transmission component 1004, and/or the like.

In some aspects, the communication manager 1004 and/or one or more components thereof may include or may be implemented within hardware (e.g., one or more of the circuitry described in connection with FIG. 12). In some aspects, the communication manager 1004 and/or one or more components thereof may include or may be implemented within a controller/processor, a memory, or a combination thereof, of the BS 110 described above in connection with FIG. 2.

In some aspects, the communication manager 1004 and/or one or more components thereof may be implemented in code (e.g., as software or firmware stored in a memory), such as the code described in connection with FIG. 13. For example, the communication manager 1004 and/or a component (or a portion of a component) of the communication manager 1004 may be implemented as instructions or code stored in a non-transitory computer-readable medium and executable by a controller or a processor to perform the functions or operations of the communication manager 1004 and/or the component. If implemented in code, the functions of the communication manager 1004 and/or a component may be executed by a controller/processor, a memory, a scheduler, a communication unit, or a combination thereof, of the BS 110 described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
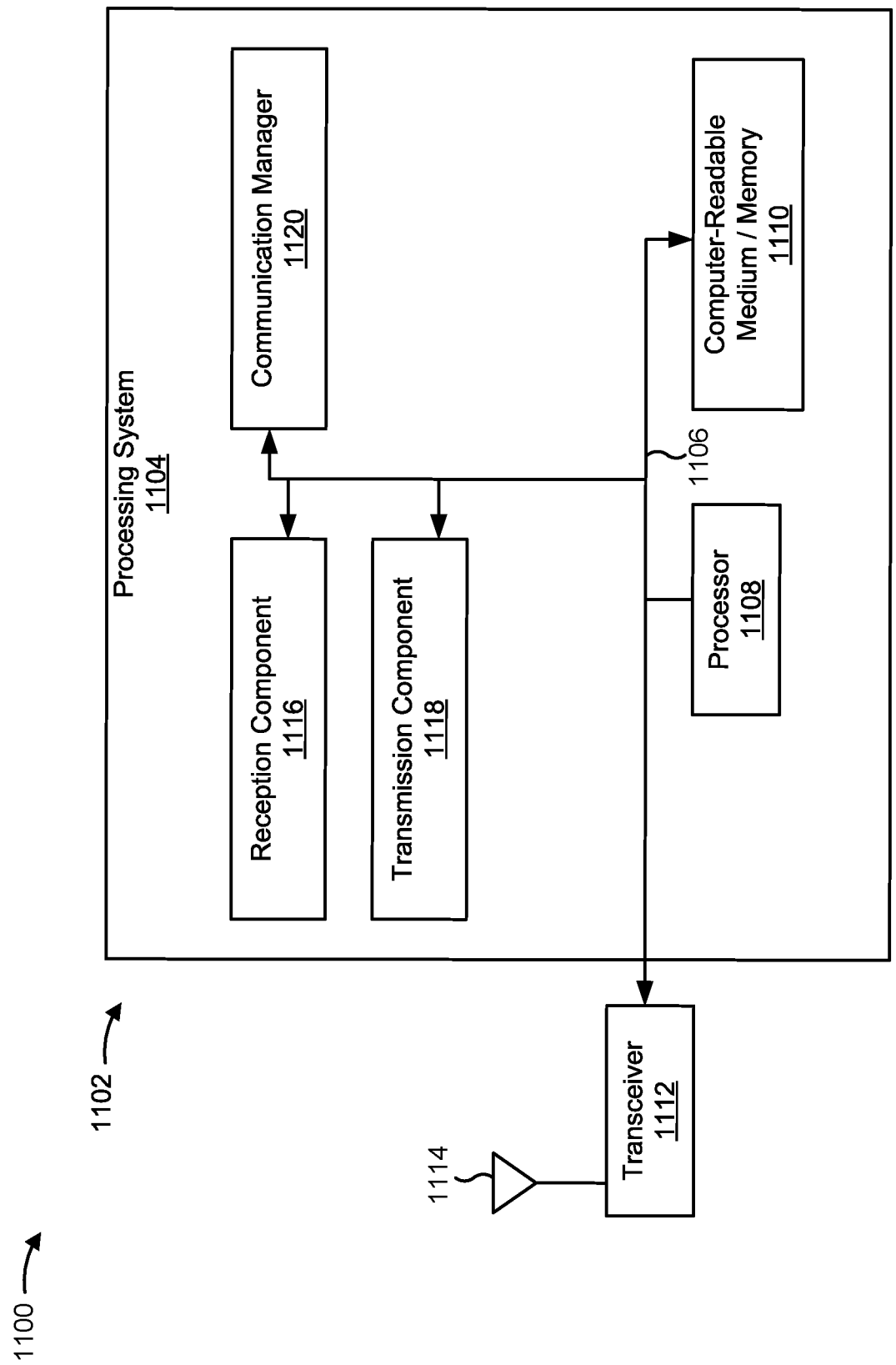

FIG. 11 is a diagram illustrating an example 1100 of a hardware implementation for an apparatus 1102 employing a processing system 1104. The apparatus 1102 may be, be similar to, include, or be included in the apparatus 1000 shown in FIG. 10.

The processing system 1104 may be implemented with a bus architecture, represented generally by the bus 1106. The bus 1106 may include any number of interconnecting buses and bridges depending on the specific application of the processing system 1104 and the overall design constraints. The bus 1106 links together various circuits including one or more processors and/or hardware components, represented by a processor 1108, the illustrated components, and the computer-readable medium/memory 1110. The bus 1106 may also link various other circuits, such as timing sources, peripherals, voltage regulators, power management circuits, and/or the like.

The processing system 1104 may be coupled to a transceiver 1112. The transceiver 1112 is coupled to one or more antennas 1114. The transceiver 1112 provides a means for communicating with various other apparatuses over a transmission medium. The transceiver 1112 receives a signal from the one or more antennas 1114, extracts information from the received signal, and provides the extracted information to the processing system 1104, specifically a reception component 1116. In addition, the transceiver 1112 receives information from the processing system 1104, specifically a transmission component 1118, and generates a signal to be applied to the one or more antennas 1114 based at least in part on the received information.

The processor 1108 is coupled to the computer-readable medium/memory 1110. The processor 1108 is responsible for general processing, including the execution of software stored on the computer-readable medium/memory 1110. The software, when executed by the processor 1108, causes the processing system 1104 to perform the various functions described herein in connection with a server. The computer-readable medium/memory 1110 may also be used for storing data that is manipulated by the processor 1108 when executing software. The processing system 1104 may include any number of additional components not illustrated in FIG. 11. The components illustrated and/or not illustrated may be software modules running in the processor 1108, resident/stored in the computer readable medium/memory 1110, one or more hardware modules coupled to the processor 1108, or some combination thereof.

In some aspects, the processing system 1104 may be a component of the UE 120 and may include the memory 282 and/or at least one of the TX MIMO processor 266, the RX processor 258, and/or the controller/processor 280. In some aspects, the apparatus 1102 for wireless communication provides means for transmitting, to a user equipment (UE), a federated learning configuration that indicates a deadline for providing a local update associated with a machine learning component, wherein the deadline comprises an ending time of a local training time period; and receiving the local update from the UE based at least in part on the federated learning configuration. The aforementioned means may be one or more of the aforementioned components of the processing system 1104 of the apparatus 1102 configured to perform the functions recited by the aforementioned means. As described elsewhere herein, the processing system 1104 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

Figure 12:
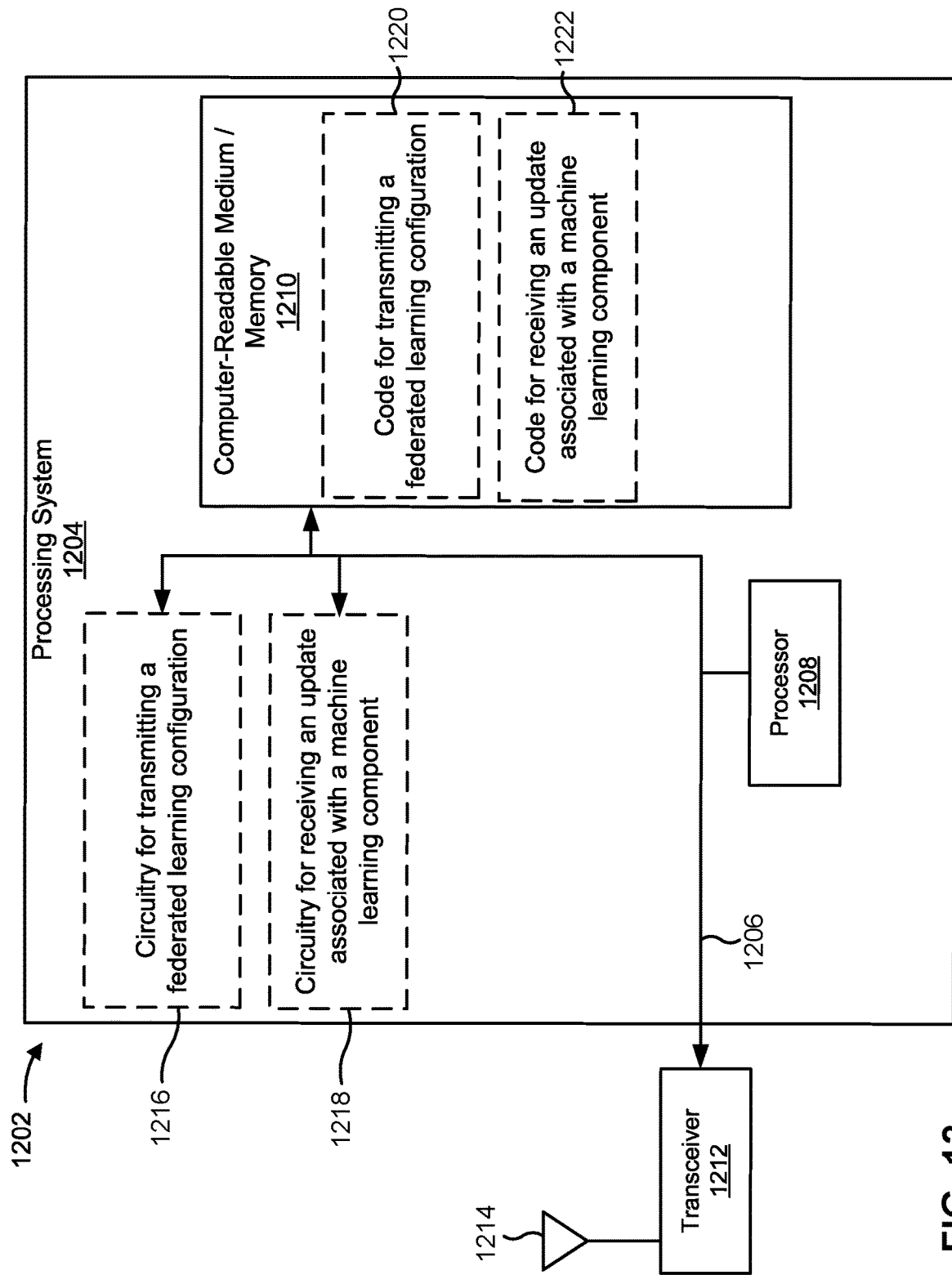

FIG. 12 is a diagram illustrating an example 1200 of an implementation of code and circuitry for an apparatus 1202 for wireless communication. The apparatus 1202 may be, be similar to, include, or be included in the apparatus 1102 shown in FIG. 11, and/or the apparatus 1000 shown in FIG. 10. The apparatus 1202 may include a processing system 1204, which may include a bus 1206 coupling one or more components such as, for example, a processor 1208, computer-readable medium/memory 1210, a transceiver 1212, and/or the like. As shown, the transceiver 1212 may be coupled to one or more antennas 1214.

As further shown in FIG. 12, the apparatus 1202 may include circuitry for transmitting, to UE, a federated learning configuration that indicates one or more parameters of a federated learning procedure associated with a machine learning component (circuitry 1216). For example, the apparatus 1202 may include circuitry 1216 to enable the apparatus 1220 to transmit, to the UE, a federated learning configuration that indicates one or more parameters of a federated learning procedure associated with a machine learning component.

As further shown in FIG. 12, the apparatus 1202 may include circuitry for receiving the local update from the UE based at least in part on the federated learning configuration (circuitry 1218). For example, the apparatus 1202 may include circuitry 1218 to enable the apparatus 1202 to receive the local update from the UE based at least in part on the federated learning configuration.

As further shown in FIG. 12, the apparatus 1202 may include, stored in computer-readable medium 1210, code for transmitting, to a UE, a federated learning configuration that indicates one or more parameters of a federated learning procedure associated with a machine learning component (code 1220). For example, the apparatus 1202 may include code 1220 that, when executed by the processor 1208, may cause the transceiver 1212 to transmit, to a UE, a federated learning configuration that indicates one or more parameters of a federated learning procedure associated with a machine learning component.

As further shown in FIG. 12, the apparatus 1202 may include, stored in computer-readable medium 1210, code for receiving the local update from the UE based at least in part on the federated learning configuration (code 1222). For example, the apparatus 1202 may include code 1222 that, when executed by the processor 1208, may cause the transceiver 1212 to receive the local update from the UE based at least in part on the federated learning configuration.

FIG. 12 is provided as an example. Other examples may differ from what is described in connection with FIG. 12.

The following provides an overview of aspects of the present disclosure:

Aspect 1: A method of wireless communication performed by a base station, comprising: transmitting, to a user equipment (UE), a federated learning configuration that indicates one or more parameters of a federated learning procedure associated with a machine learning component; and receiving a local update associated with the machine learning component from the UE based at least in part on the federated learning configuration.

Aspect 2: The method of aspect 1, wherein the local update comprises a gradient vector associated with a local loss function corresponding to the machine learning component.

Aspect 3: The method of either of aspects 1 or 2, wherein the federated learning configuration further indicates a deadline for providing the local update, wherein the deadline comprises an ending time of a local training time period.

Aspect 4: The method of aspect 3, wherein the federated learning configuration indicates the deadline by indicating an uplink resource grant for reporting the local update.

Aspect 5: The method of either of aspects 3 or 4, further comprising transmitting an uplink resource grant.

Aspect 6: The method of aspect 5, wherein transmitting the uplink resource grant comprises transmitting the uplink resource grant based at least in part on an occurrence of the deadline.

Aspect 7: The method of any of aspects 1-6, wherein the federated learning configuration further indicates a learning rate.

Aspect 8: The method of any of aspects 1-7, wherein the federated learning configuration indicates a local loss function corresponding to the machine learning component.

Aspect 9: The method of any of aspects 1-8, wherein the federated learning configuration indicates a compression scheme to be used to compress the local update for transmission.

Aspect 10: The method of any of aspects 1-9, wherein the federated learning configuration further indicates a number of training epochs to be performed by the UE during a local training time period.

Aspect 11: The method of aspect 10, wherein the number of training epochs is greater than one.

Aspect 12: The method of either of aspects 10 or 11, further comprising receiving a completion indication from the UE, wherein the completion indication indicates that the UE has performed the number of training epochs prior to a deadline.

Aspect 13: The method of aspect 12, wherein the completion indication is carried in at least one of a physical uplink control channel or a medium access control (MAC) control element.

Aspect 14: The method of either of aspects 12 or 13, further comprising transmitting a resource allocation for transmitting the local update to the base station, wherein the resource allocation is based at least in part on the completion indication, and wherein receiving the local update comprises receiving the local update based at least in part on the resource allocation.

Aspect 15: The method of any of aspects 10-14, further comprising transmitting an indication of an additional number of training epochs to be performed by the UE during an additional local training time period that is defined by an additional deadline.

Aspect 16: The method of aspect 1 of any of aspects 1-15, further comprising receiving an indication of a number of training epochs performed by the UE during a local training period.

Aspect 17: The method of any of aspects 1-16, further comprising: transmitting a training start command; and transmitting a training stop command.

Aspect 18: The method of any of aspects 1-17, further comprising receiving an indication of at least one of a training dataset size or a training minibatch size.

Aspect 19: The method of any of aspects 1-18, wherein the federated learning configuration is carried in a radio resource control message.

Aspect 20: A method of wireless communication performed by a user equipment (UE), comprising: receiving, from a base station, a federated learning configuration that indicates one or more parameters of a federated learning procedure associated with a machine learning component; and transmitting a local update associated with the machine learning component to the base station based at least in part on the federated learning configuration.

Aspect 21: The method of aspect 20, wherein the local update comprises a gradient vector associated with a local loss function corresponding to the machine learning component.

Aspect 22: The method of either of aspects 20 or 21, wherein the federated learning configuration further indicates a deadline for providing the local update, wherein the deadline comprises an ending time of a local training time period.

Aspect 23: The method of aspect 22, wherein the federated learning configuration indicates the deadline by indicating an uplink resource grant for reporting the local update.

Aspect 24: The method of either of aspects 22 or 23, further comprising receiving an uplink resource grant, wherein receiving the uplink resource grant comprises receiving the uplink resource grant based at least in part on an occurrence of the deadline.

Aspect 25: The method of any of aspects 20-24, wherein the federated learning configuration further indicates a learning rate.

Aspect 26: The method of any of aspects 20-25, wherein the federated learning configuration indicates a local loss function corresponding to the machine learning component.

Aspect 27: The method of any of aspects 20-26, wherein the federated learning configuration indicates a compression scheme to be used to compress the local update for transmission.

Aspect 28: The method of any of aspects 20-27, wherein the federated learning configuration further indicates a number of training epochs to be performed by the UE during a local training time period.

Aspect 29: The method of aspect 28, wherein the number of training epochs is greater than one.

Aspect 30: The method of either of aspects 28 or 29, further comprising: determining that the UE has performed the number of training epochs prior to a deadline; and transmitting a completion indication to the base station, wherein the completion indication indicates that the UE has performed the number of training epochs prior to the deadline.

Aspect 31: The method of aspect 30, wherein the completion indication is carried in at least one of a physical uplink control channel or a medium access control (MAC) control element.

Aspect 32: The method of either of aspects 30 or 31, further comprising receiving a resource allocation for transmitting the local update to the base station, wherein the resource allocation is based at least in part on the completion indication, and wherein transmitting the local update comprises transmitting the local update based at least in part on the resource allocation.

Aspect 33: The method of any of aspects 28-32, wherein the local training period is defined by a deadline, the method further comprising: receiving an indication of an additional number of training epochs to be performed by the UE during an additional local training time period that is defined by an additional deadline; determining that the UE has not performed the additional number of training epochs prior to an additional deadline; and refraining from transmitting an additional local update based at least in part on determining that the UE has not performed the additional number of training epochs prior to the additional deadline.

Aspect 34: The method of any of aspects 20-33, further comprising: performing one or more training epochs during a local training period; determining a number of training epochs performed by the UE during the local training period; and transmitting an indication of the number of training epochs performed by the UE during the local training period.

Aspect 35: The method of any of aspects 20-34, further comprising: receiving a training start command; and performing a plurality of training epochs based at least in part on the training start command.

Aspect 36: The method of aspect 35, further comprising: receiving a training stop command; and stopping performing the plurality of training epochs based at least in part on the training stop command.

Aspect 37: The method of any of aspects 20-36, further comprising transmitting an indication of at least one of a training dataset size or a training minibatch size.

Aspect 38: The method of any of aspects 20-37, wherein the federated learning configuration is carried in a radio resource control message.

Aspect 37: An apparatus for wireless communication at a device, comprising a processor; memory coupled with the processor; and instructions stored in the memory and executable by the processor to cause the apparatus to perform the method of one or more aspects of aspects 1-19.

Aspect 38: A device for wireless communication, comprising a memory and one or more processors coupled to the memory, the memory and the one or more processors configured to perform the method of one or more aspects of aspects 1-19.

Aspect 39: An apparatus for wireless communication, comprising at least one means for performing the method of one or more aspects of aspects 1-19.

Aspect 40: A non-transitory computer-readable medium storing code for wireless communication, the code comprising instructions executable by a processor to perform the method of one or more aspects of aspects 1-19.

Aspect 41: A non-transitory computer-readable medium storing a set of instructions for wireless communication, the set of instructions comprising one or more instructions that, when executed by one or more processors of a device, cause the device to perform the method of one or more aspects of aspects 1-19.

Aspect 42: An apparatus for wireless communication at a device, comprising a processor; memory coupled with the processor; and instructions stored in the memory and executable by the processor to cause the apparatus to perform the method of one or more aspects of aspects 20-38.

Aspect 43: A device for wireless communication, comprising a memory and one or more processors coupled to the memory, the memory and the one or more processors configured to perform the method of one or more aspects of aspects 20-38.

Aspect 44: An apparatus for wireless communication, comprising at least one means for performing the method of one or more aspects of aspects 20-38.

Aspect 45: A non-transitory computer-readable medium storing code for wireless communication, the code comprising instructions executable by a processor to perform the method of one or more aspects of aspects 20-38.

Aspect 46: A non-transitory computer-readable medium storing a set of instructions for wireless communication, the set of instructions comprising one or more instructions that, when executed by one or more processors of a device, cause the device to perform the method of one or more aspects of aspects 20-38.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network entity for wireless communication, comprising:

a memory; and one or more processors, coupled to the memory, configured to cause the network entity to:

transmit, for a user equipment (UE),
information identifying one or more parameters of a federated learning procedure associated with a machine learning component, and
information identifying a number of training epochs to be performed during a local training time period,
wherein the information identifying the one or more parameters of the federated learning procedure is transmitted via a federated learning configuration that indicates the one or more parameters of the federated learning procedure;
receive, from the UE, a completion indication that indicates the UE has performed the number of training epochs prior to a deadline; and
receive a local update, associated with the machine learning component, based at least in part on the federated learning configuration.

2. The network entity of claim 1, wherein the local update comprises a gradient vector associated with a local loss function corresponding to the machine learning component.

3. The network entity of claim 1, wherein the federated learning configuration further indicates the deadline, and
wherein the deadline comprises an ending time of the local training time period.

4. The network entity of claim 3, wherein the federated learning configuration indicates the deadline by indicating an uplink resource grant for reporting the local update.

5. The network entity of claim 1, further comprising a transceiver,
wherein the one or more processors are further configured to cause the network entity to transmit, using the transceiver, an uplink resource grant based at least in part on an occurrence of the deadline.

6. The network entity of claim 1, wherein the federated learning configuration further indicates a learning rate.

7. The network entity of claim 1, wherein the federated learning configuration indicates a local loss function corresponding to the machine learning component.

8. The network entity of claim 1, wherein the federated learning configuration indicates a compression scheme to be used to compress the local update for transmission.

9. The network entity of claim 1, wherein the federated learning configuration further indicates the number of training epochs to be performed during the local training time period.

10. The network entity of claim 1, wherein the completion indication is carried in at least one of a physical uplink control channel or a medium access control (MAC) control element.

11. The network entity of claim 1,
wherein the one or more processors are further configured to cause the network entity to transmit a resource allocation for transmitting the local update to the network entity,
wherein the resource allocation is based at least in part on the completion indication, and
wherein, to receive the local update, the one or more processors are configured to cause the network entity to receive the local update based at least in part on the resource allocation.

12. The network entity of claim 1, wherein the information that identifies the number of training epochs to be performed by the UE during the local training time period is transmitted via an indication of the number of training epochs performed by the UE during the local training time period.

13. The network entity of claim 1, wherein the one or more processors are further configured to cause the network entity to:
transmit, for the UE, a training start command, and
transmit a training stop command.

14. The network entity of claim 1, wherein the federated learning configuration is carried in a radio resource control message.

15. An apparatus for wireless communication at a user equipment (UE) for wireless communication, comprising:
a memory; and
one or more processors, coupled to the memory, configured to cause the UE to:
receive, from a network entity,
information identifying one or more parameters of a federated learning procedure associated with a machine learning component, and
information that identifies a number of training epochs to be performed during a local training time period,
wherein the information that identifies the one or more parameters of the federated learning procedure is received via a federated learning configuration that indicates the one or more parameters of the federated learning procedure;
transmit, to the network entity, a completion indication that indicates that the UE has performed the number of training epochs prior to a deadline; and
transmit a local update, associated with the machine learning component, to the network entity based at least in part on the federated learning configuration.

16. The UE of claim 15, wherein the federated learning configuration further indicates the deadline, and
wherein the deadline comprises an ending time of the local training time period.

17. The UE of claim 16, wherein the federated learning configuration indicates the deadline by indicating an uplink resource grant for the local update.

18. The UE of claim 15, further comprising a transceiver,
wherein the one or more processors are further configured to cause the UE to receive, using the transceiver, an uplink resource grant based at least in part on an occurrence of the deadline.

19. The UE of claim 15, wherein the federated learning configuration further indicates a learning rate.

20. The UE of claim 15, wherein the federated learning configuration indicates a compression scheme to be used to compress the local update for transmission.

21. The UE of claim 15, wherein the federated learning configuration further indicates the number of training epochs to be performed by the UE during the local training time period.

22. The UE of claim 15, wherein the one or more processors are further configured to cause the UE to receive a resource allocation for transmitting the local update to the network entity,
wherein the resource allocation is based at least in part on the completion indication, and
wherein, to transmit the local update, the one or more processors are configured to cause the UE to transmit the local update based at least in part on the resource allocation.

23. The apparatus of claim 15, wherein the local training time period is defined by the deadline, and
wherein the one or more processors are further configured to cause the UE to:

receive an indication of an additional number of training epochs to be performed by the UE during an additional local training time period that is defined by an additional deadline;
determine that the UE has not performed the additional number of training epochs prior to the additional deadline; and
refrain from transmitting an additional local update based at least in part on a determination that the UE has not performed the additional number of training epochs prior to the additional deadline.

24. The UE of claim 15, wherein the one or more processors are further configured to cause the UE to:
transmit an indication of the number of training epochs performed during the local training time period.

25. The UE of claim 15, wherein the one or more processors are further configured to cause the UE to:
receive a training start command,
perform a plurality of training epochs based at least in part on receiving the training start command;
receive a training stop command; and
stop performing the plurality of training epochs based at least in part on the training stop command.

26. The UE of claim 15, wherein the one or more processors are further configured to cause the UE to transmit an indication of at least one of a training dataset size or a training minibatch size.

27. A method of wireless communication performed at a network entity, comprising:
transmitting, for a user equipment (UE),
information identifying one or more parameters of a federated learning procedure associated with a machine learning component, and
information identifying a number of training epochs to be performed during a local training time period,
wherein the information identifying the one or more parameters of the federated learning procedure is transmitted via a federated learning configuration that indicates the one or more parameters of the federated learning procedure;
receiving, from the UE, a completion indication that indicates the UE has performed the number of training epochs prior to a deadline; and
receiving a local update, associated with the machine learning component, based at least in part on the federated learning configuration.

28. A method of wireless communication performed at a user equipment (UE), comprising:
receiving, from a network entity,
information identifying one or more parameters of a federated learning procedure associated with a machine learning component, and
information identifying a number of training epochs to be performed during a local training time period,
wherein the information identifying the one or more parameters of the federated learning procedure is received via a federated learning configuration that indicates the one or more parameters of the federated learning procedure;
transmitting, to the network entity, a completion indication that indicates the UE has performed the number of training epochs prior to a deadline; and
transmitting a local update, associated with the machine learning component, to the network entity based at least in part on the federated learning configuration.

29. The method of claim 27, wherein the local update comprises a gradient vector associated with a local loss function corresponding to the machine learning component.

30. The method of claim 27, wherein the federated learning configuration further indicates the deadline, and
wherein the deadline comprises an ending time of the local training time period.

31. The method of claim 27, wherein the federated learning configuration further indicates a learning rate.

32. The method of claim 28, wherein the federated learning configuration further indicates the deadline, and
wherein the deadline comprises an ending time of the local training time period.

33. The method of claim 28, wherein the federated learning configuration indicates the deadline by indicating an uplink resource grant for the local update.

34. The method of claim 28, wherein the federated learning configuration indicates a compression scheme to be used to compress the local update for transmission.

35. A non-transitory computer-readable medium storing a set of instructions for wireless communication, the set of instructions comprising:
one or more instructions that, when executed by one or more processors of a network entity, cause the network entity to:
transmit, for a user equipment (UE),
information identifying one or more parameters of a federated learning procedure associated with a machine learning component, and
information identifying a number of training epochs to be performed during a local training time period,
wherein the information identifying the one or more parameters of the federated learning procedure is transmitted via a federated learning configuration that indicates the one or more parameters of the federated learning procedure;
receive, from the UE, a completion indication that indicates the UE has performed the number of training epochs prior to a deadline; and
receive a local update, associated with the machine learning component, based at least in part on the federated learning configuration.

36. The non-transitory computer-readable medium of claim 35, wherein the local update comprises a gradient vector associated with a local loss function corresponding to the machine learning component.

37. The non-transitory computer-readable medium of claim 35, wherein the federated learning configuration further indicates the deadline, and
wherein the deadline comprises an ending time of the local training time period.

38. The non-transitory computer-readable medium of claim 35, wherein the federated learning configuration further indicates a learning rate.

39. A non-transitory computer-readable medium storing a set of instructions for wireless communication, the set of instructions comprising:
one or more instructions that, when executed by one or more processors of an apparatus, cause the apparatus to:
receive, from a network entity,
information identifying one or more parameters of a federated learning procedure associated with a machine learning component, and information identifying a number of training epochs to be performed during a local training time period, wherein the information identifying the one or more parameters of the federated learning procedure is received via a federated learning configuration that indicates the one or more parameters of the federated learning procedure;

transmit, to the network entity, a completion indication that indicates the apparatus has performed the number of training epochs prior to a deadline; and transmit a local update, associated with the machine learning component, to the network entity based at least in part on the federated learning configuration.

40. The non-transitory computer-readable medium of claim 39, wherein the federated learning configuration further indicates the deadline, and wherein the deadline comprises an ending time of the local training time period.

41. The non-transitory computer-readable medium of claim 39, wherein the federated learning configuration indicates the deadline by indicating an uplink resource grant for the local update.

42. The non-transitory computer-readable medium of claim 39, wherein the federated learning configuration indicates a compression scheme to be used to compress the local update for transmission.

43. The network entity of claim 1, wherein the machine learning component is refined based on a negative variational lower bound function.

44. The apparatus of claim 15, wherein the machine learning component is refined based on a negative variational lower bound function.

45. The method of claim 27, wherein the machine learning component is refined based on a negative variational lower bound function.

46. The method of claim 28, wherein the machine learning component is refined based on a negative variational lower bound function.

* * * * *